(12) United States Patent
Shah et al.

(10) Patent No.: US 12,238,166 B2
(45) Date of Patent: *Feb. 25, 2025

(54) PROVIDING MANAGED SERVICES IN A CLOUD ENVIRONMENT

(71) Applicant: Oracle International Corporation, Redwood Shores, CA (US)

(72) Inventors: Yomesh Rajen Shah, London (GB); Girish Ahuja, Round Rock, TX (US); Jason Michael Rothstein, Austin, TX (US); Mark Andrew Crawford, Austin, TX (US); Neeraj Kumar, New Delhi (IN); Umair Ahmed, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/221,147

(22) Filed: Jul. 12, 2023

(65) Prior Publication Data

US 2023/0353633 A1 Nov. 2, 2023

Related U.S. Application Data

(63) Continuation of application No. 17/495,691, filed on Oct. 6, 2021, now Pat. No. 11,856,055.
(Continued)

(51) Int. Cl.
*H04L 67/1036* (2022.01)
*H04L 12/66* (2006.01)
(Continued)

(52) U.S. Cl.
CPC ......... *H04L 67/1036* (2013.01); *H04L 12/66* (2013.01); *H04L 67/1008* (2013.01); *H04L 67/1014* (2013.01)

(58) Field of Classification Search
CPC ............ H04L 67/1036; H04L 67/1008; H04L 67/1014; H04L 12/66
See application file for complete search history.

(56) References Cited

U.S. PATENT DOCUMENTS

| | | | |
|---|---|---|---|
| 8,695,059 B2 * | 4/2014 | Kopti | G06F 21/56 726/4 |
| 10,009,443 B1 * | 6/2018 | Guigli | H04L 41/122 |

(Continued)

OTHER PUBLICATIONS

U.S. Appl. No. 17/495,691, "Corrected Notice of Allowance", Aug. 18, 2023, 3 pages.

(Continued)

*Primary Examiner* — Dhairya A Patel
(74) *Attorney, Agent, or Firm* — Kilpatrick Townsend & Stockton LLP

(57) ABSTRACT

The present disclosure relates to managing services by a managed service provider (MSP) in a cloud based infrastructure. A control plane of the MSP is established in a first tenancy, and a first access plane of the MSP is established in a second tenancy of a cloud environment. The control plane is configured to manage a plurality of services offered by the MSP to a first host machine included in the second tenancy. A first request is transmitted from the control plane to the first access plane, where the first request is forwarded by the first access plane to the first host machine, and corresponds to a service utilized by the first host machine and managed by the control plane of the MSP. In response to the first request being validated, a first state of the first host machine is modified in the second tenancy based on the first request.

20 Claims, 12 Drawing Sheets

Related U.S. Application Data

(60) Provisional application No. 63/166,502, filed on Mar. 26, 2021.

(51) Int. Cl.
   *H04L 67/1008*   (2022.01)
   *H04L 67/1014*   (2022.01)

(56) References Cited

U.S. PATENT DOCUMENTS

| | | | | |
|---|---|---|---|---|
| 10,944,746 | B1* | 3/2021 | Zhuang | H04W 12/12 |
| 11,074,559 | B2* | 7/2021 | Batra | G06Q 20/0855 |
| 11,469,944 | B1* | 10/2022 | Lindholm | H04L 41/0897 |
| 11,621,888 | B2* | 4/2023 | Lindholm | H04L 61/5007 709/221 |
| 11,856,055 | B2 | 12/2023 | Shah et al. | |
| 2015/0040187 | A1* | 2/2015 | Fujii | H04L 63/0876 726/3 |
| 2015/0269511 | A1* | 9/2015 | Busayarat | G06Q 10/06315 705/7.25 |
| 2018/0025399 | A1* | 1/2018 | Nedeltchev | G06Q 30/0625 705/26.62 |
| 2019/0058709 | A1* | 2/2019 | Kempf | G06F 21/64 |
| 2019/0085709 | A1 | 3/2019 | Green | |
| 2019/0097838 | A1* | 3/2019 | Sahoo | H04L 45/00 |
| 2020/0349569 | A1* | 11/2020 | Murao | G06Q 20/407 |
| 2021/0089662 | A1* | 3/2021 | Muniswamy-Reddy | H04L 63/166 |
| 2021/0157693 | A1* | 5/2021 | Waters | G06F 11/2041 |

OTHER PUBLICATIONS

U.S. Appl. No. 17/495,691, "Non-Final Office Action", Sep. 29, 2022, 9 pages.

U.S. Appl. No. 17/495,691, "Notice of Allowance", Apr. 13, 2023, 10 pages.

* cited by examiner

PROVIDING MANAGED SERVICES IN A CLOUD ENVIRONMENT

CROSS-REFERENCES TO RELATED APPLICATIONS

This application is a non-provisional of U.S. patent application Ser. No. 17/495,691 filed Oct. 6, 2021 which claims the benefit of the filing date of U.S. Provisional Application No. 63/166,502, filed on Mar. 26, 2021, the contents of which are incorporated herein by reference in their entirety for all purposes.

FIELD

The present disclosure relates to a managed service provider that provides managed services in a cloud environment across multiple customer tenancies.

BACKGROUND

Cloud-based platforms have become increasingly common for end-to-end data management in database systems. Such cloud-based platforms may offer entire suites of cloud solutions built around a customer's data. A managed service provider (MSP) is an entity (e.g., a third party company) that remotely manages a customer's information technology infrastructure and end-user systems. Different organizations hire MSPs to perform a defined set of day-to-day management services.

Providing managed services is typically performed in one of two ways: (i) a centralized managed services approach, and (ii) a distributed managed services approach. In the centralized approach, the MSP's resources (e.g., management plane) reside in an on-premise location e.g., a datacenter. The MSP connects customer tenancies in a cloud environment to the datacenter via a virtual private network. Typically, the MSP requires customers to use a pre-defined set of IP addresses to connect the customer's tenancies in the cloud to the MSP's management plane in the datacenter. As such, the MSP provides, and manages services to the customers, as a remote extension of the MSP's datacenter. Such an approach presents security challenges in managing customer's data and thus tends to be infeasible.

In contrast, in the distributed approach, the MSP deploys a management tool e.g., management plane, in each of the customer's tenancies in the cloud. In doing so, the distributed management planes will have a different system/set of accounts, and management tools per customer. Such an approach of providing managed services presents scalability issues for the MSP. Embodiments discussed herein address these and other issues individually as well as collectively.

SUMMARY

The present disclosure relates generally to a framework for providing managed services in a cloud environment across multiple customer tenancies. Various embodiments are described herein, including methods, systems, non-transitory computer-readable storage media storing programs, code, or instructions executable by one or more processors, and the like. These illustrative embodiments are mentioned not to limit or define the disclosure, but to provide examples to aid understanding thereof. Additional embodiments are discussed in the detailed description section, and further description is provided therein.

An aspect of the present disclosure provides for a method comprising establishing a control plane of a managed service provider (MSP) in a first tenancy of a cloud environment, and a first access plane of the MSP in a second tenancy of the cloud environment, wherein the control plane is configured to manage a plurality of services offered by the MSP to a first host machine included in the second tenancy of the cloud environment; transmitting a first request from the control plane of the MSP in the first tenancy to the first access plane of the MSP in the second tenancy, wherein the first request is forwarded by the first access plane of the MSP to the first host machine, and corresponds to a service utilized by the first host machine and managed by the control plane of the MSP; and responsive to the first request being validated, modifying a first state of the first host machine in the second tenancy based on the first request.

Another aspect of the present disclosure provides for a computing device comprising a processor; and a memory including instructions that, when executed with the processor, cause the computing device to, at least: establish a control plane of a managed service provider (MSP) in a first tenancy of a cloud environment, and a first access plane of the MSP in a second tenancy of the cloud environment, wherein the control plane is configured to manage a plurality of services offered by the MSP to a first host machine included in the second tenancy of the cloud environment; transmit a first request from the control plane of the MSP in the first tenancy to the first access plane of the MSP in the second tenancy, wherein the first request is forwarded by the first access plane of the MSP to the first host machine, and corresponds to a service utilized by the first host machine and managed by the control plane of the MSP; and responsive to the first request being validated, modify a first state of the first host machine in the second tenancy based on the first request.

Another aspect of the present disclosure provides a computer readable medium storing specific computer-executable instructions that, when executed by a processor, cause a computer system to at least: establish a control plane of a managed service provider (MSP) in a first tenancy of a cloud environment, and a first access plane of the MSP in a second tenancy of the cloud environment, wherein the control plane is configured to manage a plurality of services offered by the MSP to a first host machine included in the second tenancy of the cloud environment; transmit a first request from the control plane of the MSP in the first tenancy to the first access plane of the MSP in the second tenancy, wherein the first request is forwarded by the first access plane of the MSP to the first host machine, and corresponds to a service utilized by the first host machine and managed by the control plane of the MSP; and responsive to the first request being validated, modify a first state of the first host machine in the second tenancy based on the first request.

The foregoing, together with other features and embodiments will become more apparent upon referring to the following specification, claims, and accompanying drawings.

DETAILED DESCRIPTION

Figure 1:
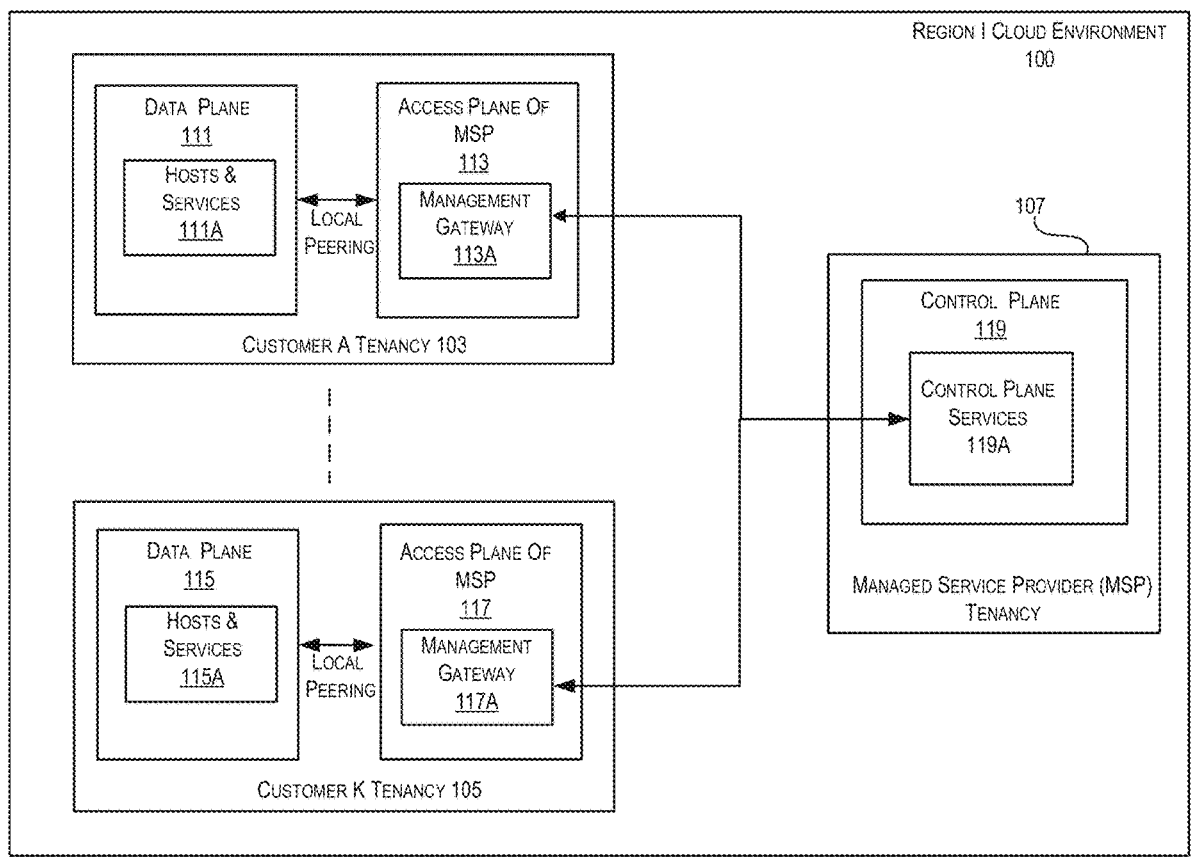
FIG. 1 depicts an exemplary architecture of providing managed services in a region of a cloud environment in accordance with various embodiments.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The present disclosure describes new and improved techniques for managing a suite of services in a cloud environment (also referred to herein as a cloud infrastructure) by a managed service provider (MSP). Novel techniques are described for configuring customer resources in the cloud infrastructure in a seamless manner and managing services utilized by customers without requiring the customers to incur a severe overhaul of the customer's systems i.e., customers are not enforced to perform configuration changes to their systems in order to avail the management of services. Additionally, the techniques of managing services (by the MSP) described herein provide for a low cost, low latency, and reduced complexity mechanism of managing the suite of services utilized by different customers.

A cloud service provider provides a variety of services to users or customers on demand using different systems and infrastructure (i.e., the cloud infrastructure). In certain embodiments, a cloud service provider may provide services under an Infrastructure-as-a-Service model, wherein the cloud service provider provides infrastructure that can be used by customers to build their own networks and deploy customer resources. The infrastructure provided by the cloud service provider may include interconnected high-performance computer resources including various host machines (also referred to as hosts), memory resources, and network resources that form a physical network, which is referred to as a substrate network or an underlay network. The infrastructure provided by the cloud service provider may be spread across one or more data centers that may be geographically spread across one or more regions.

The physical network of the cloud service provider, which includes the various host machines, memory resources, and network resources, provides the underlying basis for creating one or more virtual or overlay networks on top of the physical network. These virtual or overlay networks (also referred to as software-based or software-defined networks) are implemented using software virtualization technologies to create layers of network abstraction that can be run on top of the physical network. Overlay networks can take on many forms. Overlay networks typically use Layer-3 IP addressing with endpoints designated by their virtual IP addresses. This method of overlay networking is often referred to as virtual Layer 3 networking.

When a customer subscribes to or registers for an IaaS service provided by a cloud service provider, a tenancy is created for that customer. The tenancy is a secure and isolated partition within the cloud service provider's infrastructure where the customer can create, organize, and administer their cloud resources. For example, a customer can use resources provided by the cloud service provider to build one or multiple customizable and private virtual network(s) referred to as virtual cloud networks (VCNs) within the customer's tenancy. One or more customer resources, such as compute instances (e.g., virtual machines, bare metal instances, etc.) can be deployed on these customer VCNs.

An MSP delivers a range of services such as network testing and monitoring, managing installations and upgrades, network provisioning, providing web-hosting, providing data storage, etc., to different customers. Typically, such services are provided by connecting different customer tenancies in the cloud environment(s) to an on-premise datacenter that is managed by the MSP. Communication between the customer tenancies in the cloud and the on-premise datacenter may be facilitated via different communication protocols such as IPsec-VPN or FastConnect. As such, the MSP manages all the customer tenancies, in a centralized manner, as a remote extension of the MSP's on-premise datacenter. In such a setting, the MSP requires the customers to use a predefined set of IP addresses to connect to the MSP that utilizes a centralized management tool to provide services to different customers. Such an approach leads to security challenges in managing different customer's sensitive data.

An alternative solution for providing managed services is to deploy a management model in each of the customer tenancies in the cloud infrastructure. In this approach, the MSP provides a different management tool per customer to manage the various services. Such a distributed approach is not a cost effective solution for the MSP and presents scalability issues. Another approach for providing managed services is via a network address translation (NAT) technique. In this approach, the MSP is required to perform a NAT operation on each managed host's address, which leads to the host being recognized (by the MSP) by a different IP address. Such an approach leads to complications in supporting the customer tenancy environment(s) through both manual and automated means, presents economies of scale issues, and is computationally exhaustive.

As described herein, a new architecture is provided for managing services (in the cloud) utilized by the customers. By certain embodiments, the MSP builds or establishes (i.e., deploys) a control plane in the cloud (rather than in an on-premise datacenter), and deploys an access plane in each of the customer tenancies in the cloud i.e., the access plane co-resides with a customer's data plane in the customer's tenancy. It is appreciated that the control plane is established in a separate tenancy (e.g., a managed service provider tenancy) as compared to the access plane(s). The customer systems i.e., resources deployed in the customer's tenancy communicates with the control plane via the access plane deployed in the customer's tenancy. Such an architecture provisions customers to have a fully managed service which includes allowing access for product experts to the customer's managed environment(s), and systems access to/from a pluggable architecture of management and value-added services within which all services come from the control plane of the MSP. Moreover, the mechanism provides managed services to customer tenancies in the cloud environment at a scale that is provided in a managed datacenter.

Turning to FIG. 1, there is depicted an exemplary architecture of providing managed services in a region of a cloud environment in accordance with various embodiments. As shown in FIG. 1, a region of the cloud environment 100 (e.g., region I) includes a managed service provider's (MSPs) tenancy 107, and a plurality of customer tenancies e.g., customer A tenancy 103, customer K tenancy 105, etc. The MSP tenancy 107 includes a control plane 119 of the MSP that provides (and manages) a suite of services 119A to host machines included in the plurality of customer tenancies. In other words, a single control plane (e.g., control plane 119) of the MSP provides services to different customer tenancies included in the region of the cloud environment.

By some embodiments, the MSP deploys an access plane in each of the customer tenancies included in the region of the cloud environment 100. For instance, an access plane of the MSP 113 is deployed in customer A tenancy 103, and an access plane 117 is deployed in customer K tenancy 105. Each access plane of the MSP co-resides with a customer's data plane within the customer's tenancy. For example, the access plane 113 co-resides with a data plane 111 within customer A tenancy 103, and access plane 117 co-resides with data plane 115 within customer K tenancy 105. Each data plane includes a plurality of host machines that avail services offered (and managed) by the MSP. For instance, data plane 111 includes a plurality of hosts (and services availed by the hosts) 111A, and data plane 115 includes a plurality of hosts (and services availed by the hosts) 115A.

By some embodiments, the MSP deploys a management gateway in each access plane. For instance, access plane 113 includes a management gateway 113A, and access plane 117 includes a management gateway 117A. The MSP configures each management gateway by allocating the gateway a unique global IP address. The access plane deployed in each customer tenancy (e.g., access planes 113 and 117) perform proxy services for connections originating from customer's data plane (and intended for the MSP's control plane 119), and connections originating from the control plane 119 of the MSP (and intended for a host associated with the data plane). In this manner, the access planes that reside in the respective customer tenancies provide the control plane 119, a gateway to communicate with host machine(s) of the customer included in the customer's tenancies. Details regarding the proxy services provided by the access planes as well as the suite of services provided by the control plane are described later with reference to FIG. 3.

According to some embodiments, each of the access planes (i.e., 113 and 117) may include a list of management services (e.g., a registry) provided by the MSP for the respective customer tenancies. The services offered in each registry may correspond to managed services such as a customer dedicated proxy, a file service gateway, etc. Further, in each customer tenancy, the data plane of the customer tenancy is communicatively coupled with corresponding access plane via local peering techniques.

Figure 2:
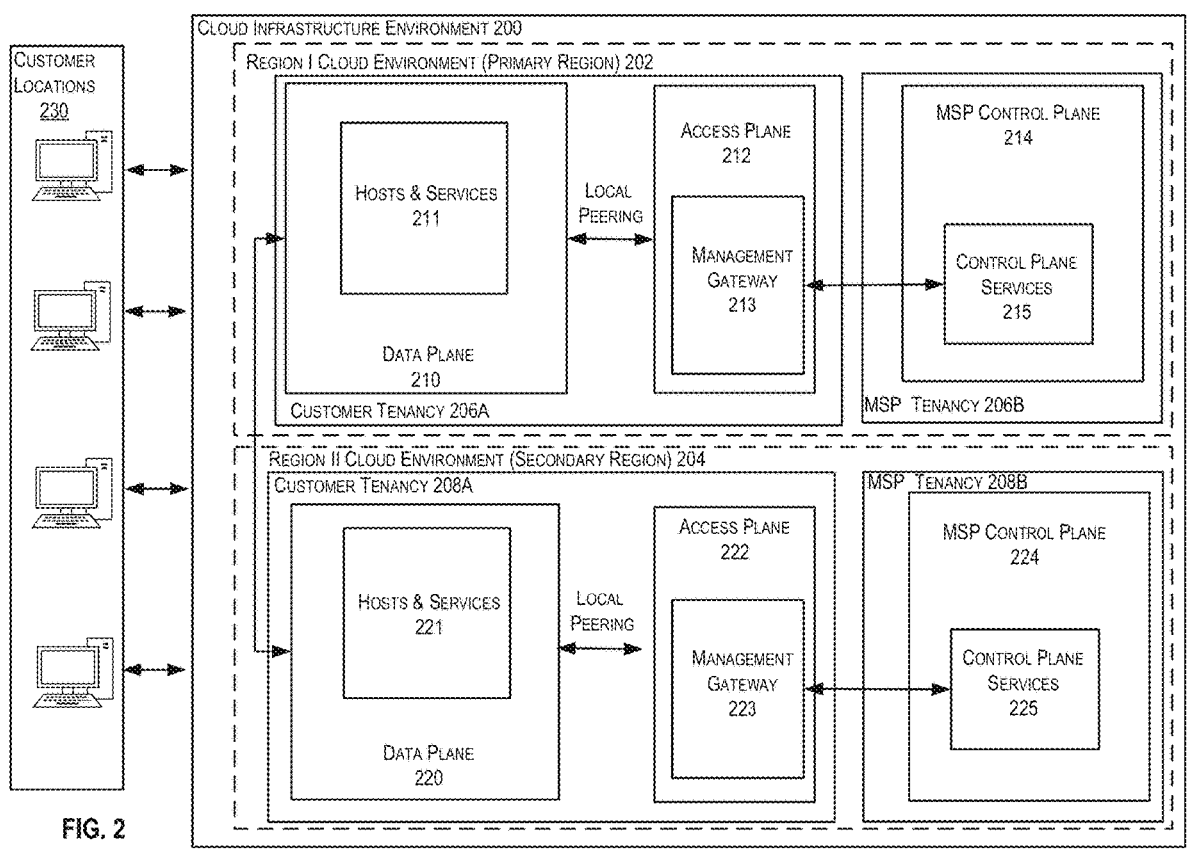
FIG. 2 depicts an exemplary architecture of providing managed services in a cloud environment in accordance with various embodiments.

FIG. 2 depicts an exemplary cloud infrastructure environment 200 in which an MSP provides managed services in accordance with some embodiments. The cloud infrastructure environment 200 includes a first region (i.e., a primary region) 202 of the cloud environment, and a second region (i.e., a secondary region) 204 of the cloud environment. Each region of the cloud infrastructure environment 200 includes a customer tenancy and a MSP tenancy. For example, as depicted in FIG. 2, the first region 202 of the cloud environment includes a first customer tenancy 206A and a first MSP tenancy 206B, whereas the second region 204 of the cloud environment includes a second customer tenancy 208A and a second MSP tenancy 208B.

By some embodiments, for each region of the cloud environment, the MSP deploys a control plane in an MSP tenancy of the region of the cloud environment, and deploys an access plane within a customer tenancy of the region of the cloud environment. For instance, with respect to the first region 202 of the cloud environment, the MSP deploys a control plane 214 in the MSP tenancy 206B, and an access plane 212 within the customer tenancy 206A of the region of the cloud environment. In a similar manner, with respect to the second region 204 of the cloud environment, the MSP deploys a control plane 224 in the MSP tenancy 208B, and an access plane 222 within the customer tenancy 208A of the region of the cloud environment.

Further, the MSP deploys a management gateway in each access plane. For instance, access plane 212 (deployed in a customer tenancy included in the first region of the cloud environment) includes a management gateway 213, and access plane 222 (deployed in a customer tenancy included in the second region of the cloud environment) includes a management gateway 223. The MSP configures each management gateway (i.e., gateways 213 and 223) by allocating the gateway a unique global IP address. It is appreciated that each region of the cloud environment includes a dedicated MSP control plane (i.e., MSP control plane 214 for primary region 202, and MSP control plane 224 for secondary region 204) that provides (and manages) a suite of services to host machines included in customer tenancies of the respective regions of the cloud environment.

Each access plane of the MSP (i.e., access planes 212 and 222) co-resides with a customer's data plane within the customer's tenancy. For example, the access plane 212 co-resides with data plane 210 within customer tenancy 206A, and access plane 222 co-resides with data plane 220 within customer tenancy 208A. Each data plane includes a plurality of host machines that avail services offered (and managed) by the MSP's control plane included within the region of the cloud environment. For example, data plane 210 includes a plurality of hosts 211 that avail services provided by the MSP's control plane 214 (i.e., control plane services 215), and data plane 220 includes a plurality of hosts 221 that avail services provided by the MSP's control plane 224 (i.e., control plane services 225). Within each region, the access plane deployed in the customer tenancy (e.g., access planes 212 deployed in customer tenancy 206A, and access plane 222 deployed in customer tenancy 208A), perform proxy services (via the respective management gateways included in the access planes) for connections originating from customer's data plane and intended for the MSP's control plane, and vice versa.

It is noted that users associated with each of the data planes 210 and 220 may access the suite of services e.g., via a VCN connection from different geographical customer locations (e.g., on-premise locations) represented as 230. Furthermore, each of the primary region data plane 210 and the secondary region data plane 220 are communicatively coupled with their respective access planes i.e., access planes 212 and 222 via local peering techniques. Additionally, the primary region data plane 210 may be communicatively coupled to the secondary region data plane 220 via remote peering techniques. It is also appreciated that for sake of illustration, each of the primary region and the secondary region of the cloud infrastructure environment 200 of FIG. 2 is depicted to include a single customer tenancy. However, this is in no way limiting the scope of the present disclosure. Rather, each region of the cloud infrastructure may include multiple customer tenancies, where services availed by each customer tenancy of a region is controlled and managed by the MSP's control plane corresponding to the region.

Figure 3:
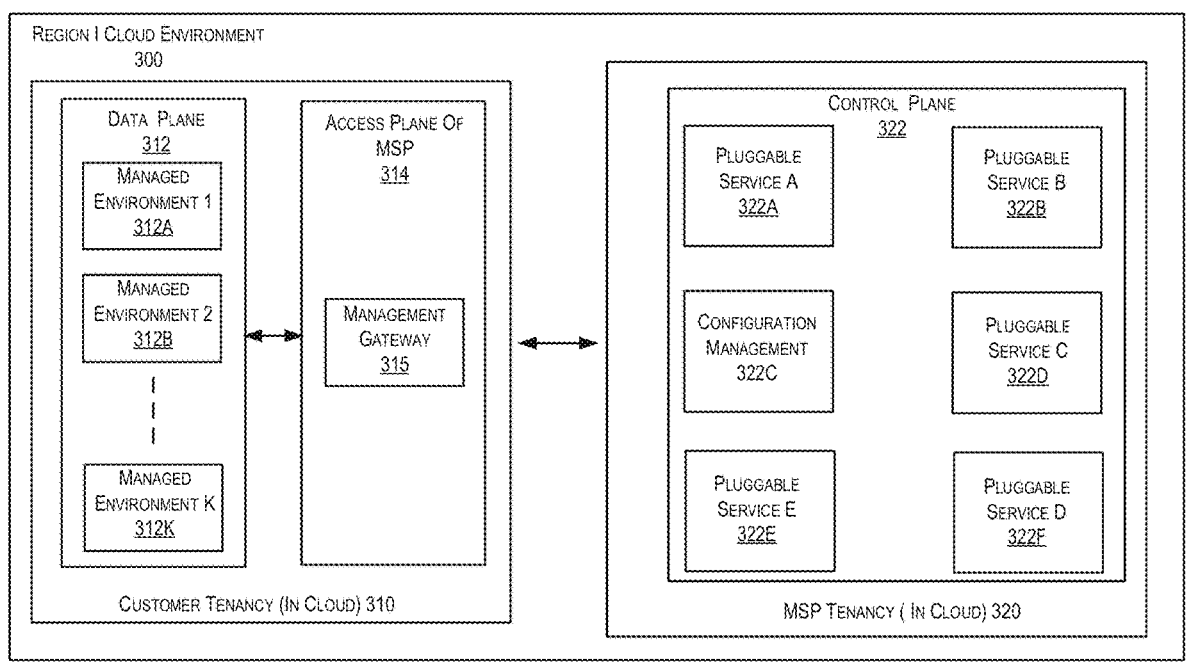
FIG. 3 depicts another exemplary architecture illustrating details of providing managed services in a cloud environment in accordance with various embodiments.

FIG. 3 depicts an exemplary architecture illustrating details of providing managed services in a cloud environment in accordance with various embodiments. As shown in FIG. 3, a cloud environment of a region 300 includes a customer tenancy 310 and a MSP tenancy 320. The MSP tenancy 320 includes a control plane 322 of the MSP. The control plane 322 of the MSP hosts a suite of services e.g., pluggable service A 322A, pluggable service B 322B, pluggable service C 322D, pluggable service E 322E, and pluggable service F 322F. The services may correspond to services such as authentication/authorization services, consolidated data-logging services, testing and monitoring services, web-hosting services, network provisioning services and the like.

Additionally, the control plane 322 hosts a configuration management service 322C that is utilized in configuring customer system(s). The configuration management service 322C is utilized to configure host machines (e.g., set a state of one or more host machines) that avail of at least one service from the suite of services offered and managed by the MSP. By some embodiments, configuring a host machine may include modifying/updating an existing state of the host machine. A state of the host machine is defined by one or more operational parameters of the host machine. As such, configuring the host machine may include setting/updating values of the one or more operational parameters of the host machine. Details pertaining to the configuration management service provided by the MSP is described later with reference to FIG. 4B.

The customer tenancy 310 included in the cloud environment 300 comprises a data plane 312 and an access plane 314 i.e., the access plane 314 (of the MSP) co-resides with the customer's data plane 312 within the customer tenancy 310. The data plane 312 includes a plurality of managed environments 312A-312K (i.e., one or more host machines of the customer that avail services offered (and managed) by the MSP), that are associated with the data plane 312 of the customer.

The access plane 314 of the MSP that is deployed in the customer' tenancy 310 in the cloud includes a management gateway 315. By some embodiments, the management gateway 315 is allocated a unique global IP address and performs proxy services for connections originating from customer's data plane 312 (and intended for the MSP's control plane 322) and connections originating from the control plane 322 of the MSP (and intended for a host associated with the data plane 312). In this manner, the access plane 314 (residing in the customer's tenancy) provides the control plane 322 of MSP (residing in the MSP tenancy 320), a gateway to communicate with host machine(s) of the customer included in the customer's tenancy 310.

By some embodiments, the access plane 314 can implement authorization rules which ensure that only legitimate connections are established between the control plane of the MSP 322 and host machines included in the data plane 312 of the customer's tenancy 310. For example, the access plane 314 may allow connections from the control plane 322 that have a valid identifier included in a message originating from the control plane 322 e.g., an identifier associated with the control plane of the MSP 322. Further, as the access plane 314 of the MSP forms an interface between the data plane 312 of the customer and the control plane 322 of the MSP, each host associated with the data plane 312 allows connections that are transmitted via the access plane 314 i.e., via the management gateway 315 included in the access plane 314. It is appreciated that the host can verify whether a connection is a legitimate connection based on the unique global IP address of the management gateway 315 included in messages transmitted to the host.

According to some embodiments, the configuration management service 322C includes a one-time configuration setup e.g., setup of the customer's system (i.e., host machines of the customer deployed in the data plane 312 included in the customer tenancy 310). The configuration of the host machines can be performed by the MSP via the access plane 314. In the configuration of a host machine (e.g., performed by the configuration management unit 322C), the MSP can assign each host machine a unique host tag i.e., a host machine identifier, as well as a regional tag i.e., an identifier associated with a region of the cloud environment in which the customer tenancy is included. In this manner, each host machine in cloud environment may be identified via a pair of identifiers including the unique host tag and the regional tag. Upon configuring the host machines, the host machines can communicate with the control plane 322 (included in the MSP tenancy 320) via the access plane 314 of the MSP deployed in the customer's tenancy 310. In this manner, a customer is provisioned with a suite of fully managed services that include allowing access to product experts to managed environments in the data plane 312 and system access to value-added services deployed in the control plane 322 of the MSP.

It is appreciated that control plane of the MSP e.g., control plane 322 is built/deployed using automated means, and managed using both automated and manual means. The control plane 322 may interact with multiple access planes (belonging to different customer tenancies in the region of the cloud environment), which are in turn built using automated or manual means. The access plane provides access for both managed automated and manual management of the related customer environment(s) by control plane services and managed cloud services authorized personnel.

Figure 4A:
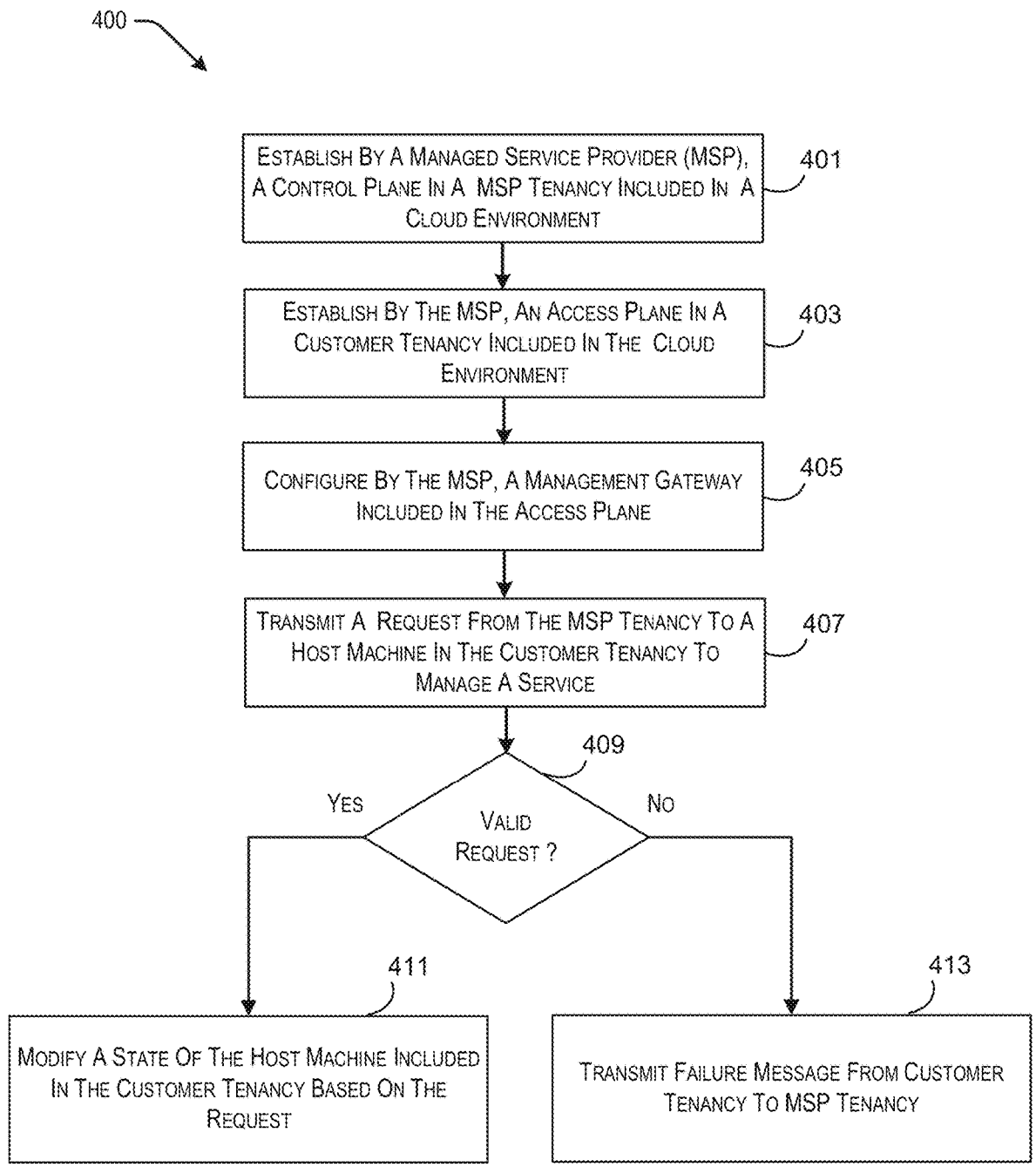
FIG. 4A illustrates a simplified flowchart depicting steps performed by a managed service provider, according to certain embodiments.

FIG. 4A illustrates a simplified flowchart depicting steps performed by a managed service provider, according to certain embodiments. The processing depicted in FIG. 4A may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 4A and described below is intended to be illustrative and non-limiting. Although FIG.

4A depicts the various processing steps occurring in a particular sequence or order, this is not intended to be limiting. In certain alternative embodiments, the steps may be performed in some different order or some steps may also be performed in parallel.

The process commences in step 401, where an MSP establishes (i.e., deploys) a control plane in a tenancy (i.e., MSP tenancy) in a cloud environment. In step 403, the MSP establishes an access plane in a customer tenancy included in the cloud environment. Specifically, the access plane co-resides with a data plane in the customer tenancy of the cloud environment.

In step 405, the MSP configures a management gateway deployed within the access plane. By some embodiments, the MSP configures the management gateway by assigning the management gateway a global unique IP address. The access plane (along with the management gateway) performs proxy services for connections originating from a customer's data plane and intended for the MSP's control plane, as well as for connections originating from the control plane of the MSP and intended for a host associated with the data plane.

The process then moves to step 407, where a request is transmitted from the control plane of the MSP to a host machine included in the customer tenancy. The request may correspond to a request to manage a service provided by the MSP to the host machine. It is appreciated that the request is forwarded from the control plane to the access plane of the MSP, wherein the management gateway included in the access plane forwards the request to the host machine.

In step 409, a query is executed to determine whether the request is a valid request. If the response to the query is affirmative (i.e., the request is a valid request) then the process moves to step 411. However, if the response to the query is negative, then the process moves to step 413. By some embodiments, the verification as to whether the request is valid request is performed in two stages: (i) the access plane determines whether or not the initiated connection (from the control plane of the MSP) is to be authorized. For instance, the management gateway executes a query to determine whether the request is to be authorized based on an identifier (e.g., an identifier associated with the control plane of the MSP) included in the request transmitted from the control plane to the access plane. If the management plane determines that a valid identifier is included in the request, then the management gateway authorizes the request and forwards the request to the host machine, and (ii) the host machine upon receiving the request determines whether the request includes an address corresponding to the global unique IP address of the management gateway included in the access plane.

Upon the request being successfully validated, in step 411, the MSP executes the service provided to the host machine and modifies a state of the host machine to reflect that the host machine has availed the service. For instance, by some embodiments, the MSP modifies the state of the host machine by setting one or more operational parameters of the host machine. For example, the MSP may set an operational parameter of the host machine to a value of '1' to indicate that the requested service (e.g., email delivery, file transfer, logging service, etc.) is successfully provided to the host machine. If the response to the query in step 409 is negative (i.e., request is not a valid request), then the process moves to step 413, where a failure of service message is transmitted from the host machine in the customer tenancy to the control plane in the MSP tenancy.

Figure 4B:
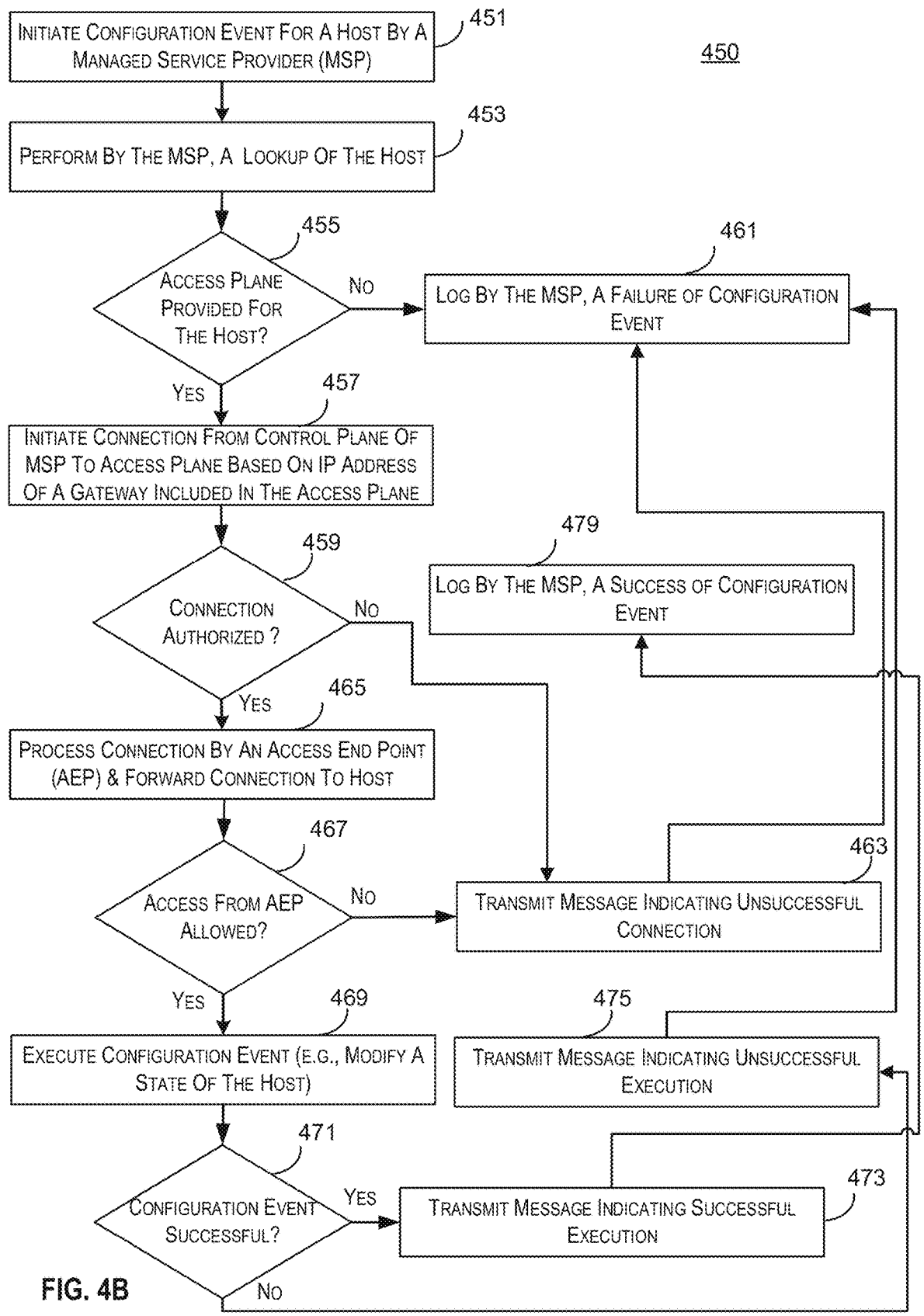
FIG. 4B illustrates a flowchart depicting steps performed in a configuration management service provided by a managed service provider, according to certain embodiments.

FIG. 4B illustrates a flowchart depicting steps performed in a configuration management service provided by a managed service provider, according to certain embodiments. The processing depicted in FIG. 4B may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 4B and described below is intended to be illustrative and non-limiting. Although FIG. 4B depicts the various processing steps occurring in a particular sequence or order, this is not intended to be limiting. In certain alternative embodiments, the steps may be performed in some different order or some steps may also be performed in parallel. In certain embodiments, such as in the embodiment depicted in FIG. 3, the flowchart depicted in FIG. 4B may be performed by the configuration management service 322C deployed in the control plane 322.

In step 451, the MSP initiates, via the configuration management service deployed in a control plane of the MSP, a configuration event for a host. In step 453, the MSP performs a lookup operation of the host. Specifically, the host may be a member of a group i.e., customer tenancy that is identified by an identifier e.g., customer code and/or a region tag associated with the customer tenancy.

In step 455 a query is performed to determine whether an access plane is provided for the host. Specifically, the MSP determines whether an access plane is deployed i.e., co-resided with a data plane of a customer tenancy of the host. If the response to the query is affirmative, the process moves to step 457. If the response to the query in step 455 is negative, the process moves to step 461. In step 461, the MSP logs a failure of the configuration event (i.e., due to the access plane being undeployed in the customer tenancy) and terminates the configuration management process. Upon successfully determining the deployment of the access plane in step 455, the MSP obtains a global IP address assigned to the management gateway of the access plane and initiates a connection from the control plane of the MSP to the access plane that is deployed in the customer's tenancy in step 455.

In step 459, the access plane determines whether or not the initiated connection is to be authorized. For instance, a management gateway (deployed in the access plane) executes a query to determine whether the initiated connection is to be authorized. By some embodiments, the management gateway authorizes the connection based on an identifier (e.g., an identifier associated with the control plane of the MSP) included in a message transmitted from the control plane to the access plane. If the response to the query of step 459 is affirmative (i.e., the connection is authorized), the process moves to step 465, whereas if the response to the query is negative (i.e., the connection is unauthorized), the process moves to step 463. By some embodiments, in step 463, the management gateway included in the access plane transmits a message to the control plane of the MSP indicating an unauthorized access attempt (i.e., connection is not established), whereafter the process moves to step 461, wherein the MSP logs a failure of the configuration event.

In response to the query of step 459 being successfully authorized, in step 465, an access end-point processes the connection and forwards the connection to the host. Thereafter, the process moves to step 467, wherein a host in the customer's tenancy executes a query to determine whether a connection originating from the access end-point is allowed access. For example, the host may determine to allow only those connections from the access plane based on verifying whether an address included in the connection request corresponds to the global unique IP address of the management gateway included in the access plane. If the response to the query of step 467 is affirmative, then the process moves to step 469, else the process moves to step 463.

In response to the host denying the connection, the host (at step 463) generates a message indicating an unsuccessful connection establishment. The message is transmitted to the access plane, wherein the management gateway forwards the message to the control plane of the MSP. Thereafter, the process moves to step 461, wherein the MSP logs a failure of the configuration event. If the host allows the connection, then the host at step 469 executes the configuration event. Specifically, the host system is configured based on information included in the configuration request message initiated by the control plane of the MSP. For instance, the MSP may configure the host machine by setting one or more operational parameters of the host machine.

Further, in step 471, the host executes a query to determine whether the configuration event was successfully executed. If the response to the query of step 471 is affirmative, the process moves to step 473, else if the response to the query is negative, the process moves to step 475. At step 473, the host transmits a message indicating successful execution of the configuration event to the access plane, which in turn forwards the message (via the management gateway) to the control plane of the MSP. Thereafter, the process moves to step 479 wherein the MSP logs the configuration event as being executed successfully. If the response to the query of 471 is negative, then the host machine transmits a message (at step 475) indicating unsuccessful execution of the configuration event to the access plane, which in turn forwards the message (via the management gateway) to the control plane of the MSP. Thereafter, the process moves to step 461, wherein the MSP logs the configuration event as being executed unsuccessfully.

Figure 5A:
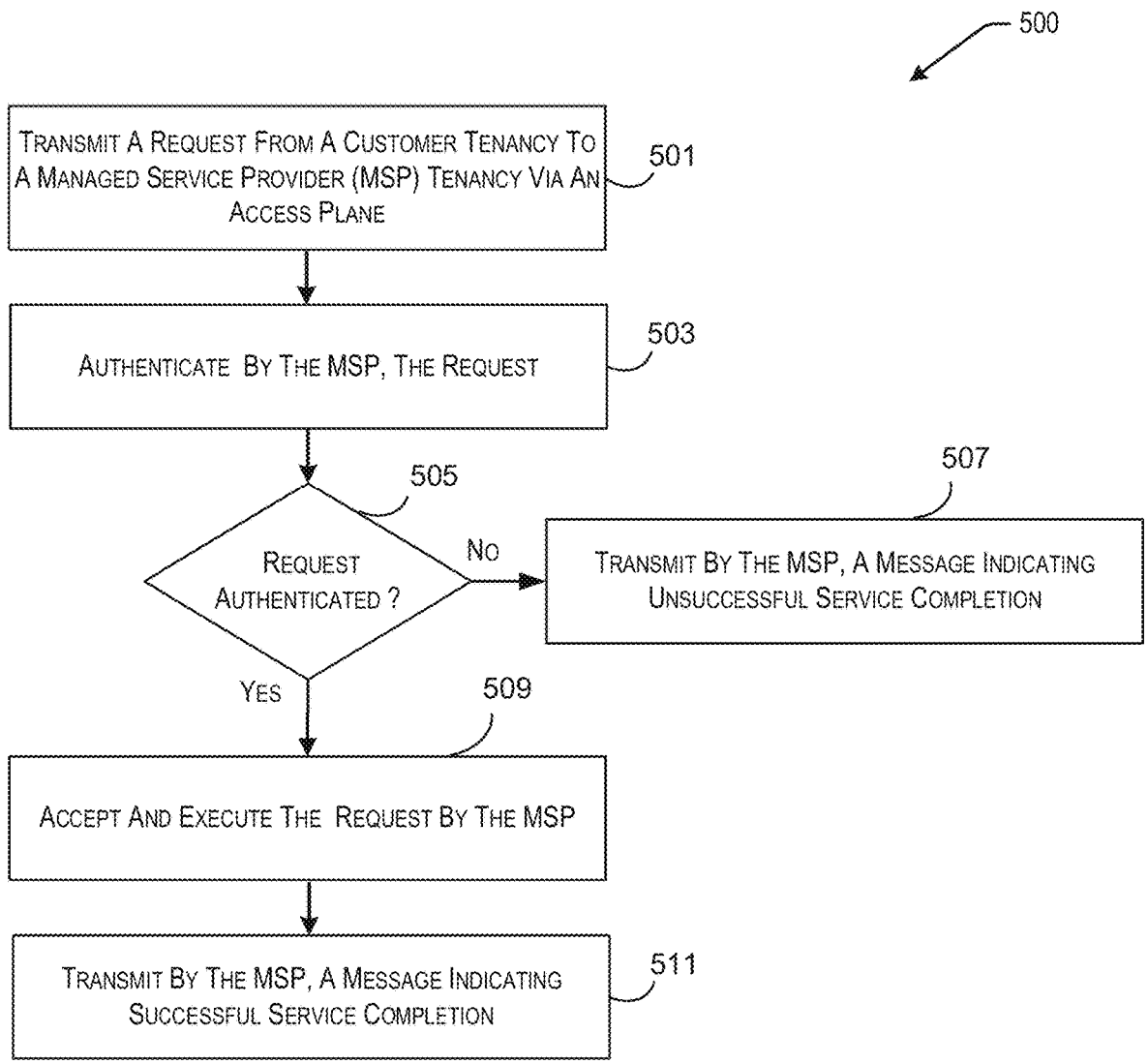
FIG. 5A illustrates a simplified flowchart depicting steps performed in a service request initiated by a host, according to certain embodiments.

FIG. 5A depicts illustrates a simplified flowchart depicting steps performed in a service request initiated by a host, according to certain embodiments. The processing depicted in FIG. 5A may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 5A and described below is intended to be illustrative and non-limiting. Although FIG. 5A depicts the various processing steps occurring in a particular sequence or order, this is not intended to be limiting. In certain alternative embodiments, the steps may be performed in some different order or some steps may also be performed in parallel.

The process commences in step 501, where a request for a service is transmitted from a host machine included in a customer tenancy of the cloud environment to a control plane of the MSP (included in the MSP tenancy of the cloud environment). It is appreciated that the request is transmitted from the customer tenancy to the control plane of the MSP via the management gateway included in the access plane. In step 503, the control plane upon receiving the request executes a process to authenticate the request. By some embodiments, the control plane authenticates the request by determining whether the request includes a valid host tag and/or a region tag. It is appreciated that each host machine in cloud environment is assigned a region and/or host tag by the MSP during configuration or setup process.

In step 505, a query is executed to determine whether the request is authenticated. If the response to the query is affirmative, then the process moves to step 509, else if the response to the query is negative, then the process moves to step 507. In step 507 i.e., upon determining that the request is not a valid request, the MSP transmits a message (to the host machine) indicating an unsuccessful service completion. In step 509 i.e., upon determining that the request is a valid request, the control plane of the MSP accepts, and executes, the service request. Thereafter, in step 511, the control plane transmits a message to the host machine indicating a successful completion of the service request.

Figure 5B:
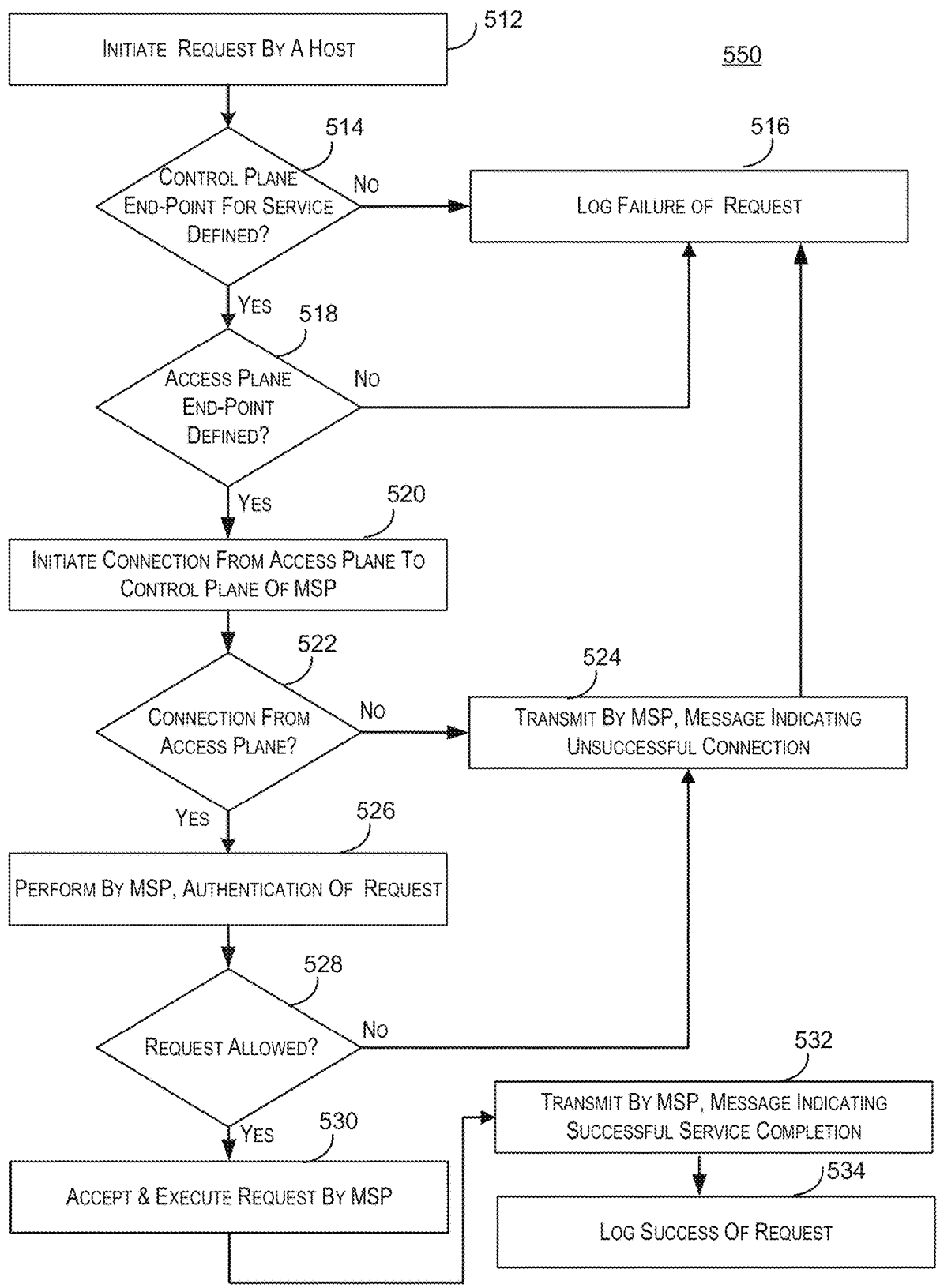
FIG. 5B illustrates a flowchart depicting steps performed in executing a service request initiated by a host machine, according to certain embodiments.

FIG. 5B illustrates a flowchart 550 depicting steps performed in executing a service request initiated by a host machine, according to certain embodiments. The processing depicted in FIG. 5B may be implemented in software (e.g., code, instructions, program) executed by one or more processing units (e.g., processors, cores) of the respective systems, hardware, or combinations thereof. The software may be stored on a non-transitory storage medium (e.g., on a memory device). The method presented in FIG. 5B and described below is intended to be illustrative and non-limiting. Although FIG. 5B depicts the various processing steps occurring in a particular sequence or order, this is not intended to be limiting. In certain alternative embodiments, the steps may be performed in some different order or some steps may also be performed in parallel.

The process commences in step 512, where a service request is initiated by a host machine (also referred to herein as a host) that belongs to a customer tenancy. The service request may correspond to a request for transmission of an email. At step 514, a query is executed to determine whether a control plane end-point for the service (e.g., email) is defined. Specifically, a query is made to check whether the control plane of the MSP provides the service i.e., service is managed by the MSP. If the response to the query in step 514 is affirmative, the process moves to 518. If the response to the query is negative, the process moves to step 516.

In response to the control plane of the MSP not providing the service, the host logs a failure of the service request (in step 516), whereafter the process terminates. However, if the control plane of the MSP provides the service, the process at step 518 executes a further query to determine whether an access plane end-point is defined in the customer tenancy for the service. For instance, the host determines whether a management gateway in the access plane (that co-resides with the customers data plane in the customer tenancy) has been set up to accept service requests. If the response to the query in step 518 is affirmative, then the process moves to step 520. If the response to the query of step 518 is negative, then the process moves to step 516, wherein the host logs a failure of the service request.

At step 520, a connection is initiated from the access plane of the MSP to the control plane of the MSP. At step 522, the control plane of the MSP executes a query to determine whether the initiated connection originates from the access plane of the MSP that resides in the customer tenancy. If the response to this query is affirmative, then the process moves to step 526, else the process moves to step 524. At step 524, i.e., upon the control plane of the MSP determining that the connection has not originated from the access plane, a message indicating an unsuccessful connection is transmitted from the control plane to the host, whereafter the host logs a failure of the connection request in step 516. By one embodiment, the control plane of the MSP is configured to determine whether the connection request originates from the MSPs access plane by examining an address included in the service request. If the address corresponds to the global unique IP address of the management gateway included in the access plane of the MSP, the control plane determines successfully that the connection under consideration originated from the access plane.

At step 526, the control plane of the MSP proceeds to authenticate the host requesting the service. By one embodiment, the authentication is performed based on a certificate included in the service request. It is noted that in the configuration process as illustrated in FIG. 4B, the control plane of the MSP allocates a unique certificate to each host (e.g., the host tag and a region tag) whose services are being managed by the MSP. In this manner, at step 528 the control plane may verify whether the certificate included in the service request corresponds to an authentic host. Specifically, the process in step 528 determines whether the request is to be allowed based on the authentication process performed with respect to the certificate. If the request is to be allowed, the process moves to step 530, else the process moves step 524.

At step 524, i.e., upon the request not being allowed, a message indicating an unsuccessful request service is transmitted from the control plane to the host, whereafter the host logs a failure of the service request in step 516. In response to the request being allowed, at 530, the request is accepted for execution e.g., in the case of an email delivery request, the control plane accepts the email for delivery to it's intended destination. Thereafter, the process moves to step 532, wherein a message indicating successful service completion is transmitted from the control plane to the host. The host at step 534 logs the service request as being successfully executed.

Thus, by embodiments described above, a single instance of a MSP's control plane deployed in a region of a cloud environment (rather than in a datacenter) interacts with multiple MSP access planes (one for each customer tenancy included in the region), and provides managed services for different host machines. The access planes provide access for both managed automated and manual management of related customer environment(s) by MSP's control plane services and managed cloud services authorized personnel. The managed services architecture described in the above embodiments offers transparent managed services at a scale appropriate for efficient managed service provider operations. Additionally, the managed services architecture of the present disclosure incurs at least six distinct capabilities that are available simultaneously and continuously. All of these capabilities are provided to separate data planes of software products and data owned entirely by different customers. The capabilities include at least:
1. The ability for MSP authorized personnel to access a customer's managed environment as needed to facilitate providing services, with employee attrition within the MSP requiring no changes to the customer's managed environment(s).
2. The ability for MSP authorized personnel to access services operated within the control plane.
3. The ability for services operated within the control plane to access a customer's managed environment's services.
4. The ability for a customer's environment to access and utilize automated services operated within the Control Plane.
5. The ability to perform automated management of a customer's managed environment through the control plane.
6. The ability to perform operations across multiple managed environments to facilitate en masse operations as necessary.

Furthermore, advantages incurred by the managed services architecture of the present disclosure include at least: a reduction in control plane failure domains to more closely match the failure domains of the managed environments being serviced within the cloud infrastructure; a reduction in network complexity, cost, and latency between the control plane and access planes in the most commonly managed scenarios; and separation of MSP personnel access.

Example Infrastructure as Service Architectures

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (e.g., billing, monitoring, logging, security, load balancing and clustering, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (VMs), install operating systems (OSs) on each VM, deploy middleware such as databases, create storage buckets for workloads and backups, and even install enterprise software into that VM. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling (OS), middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different problems for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more security group rules provisioned to define how the security of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 6:
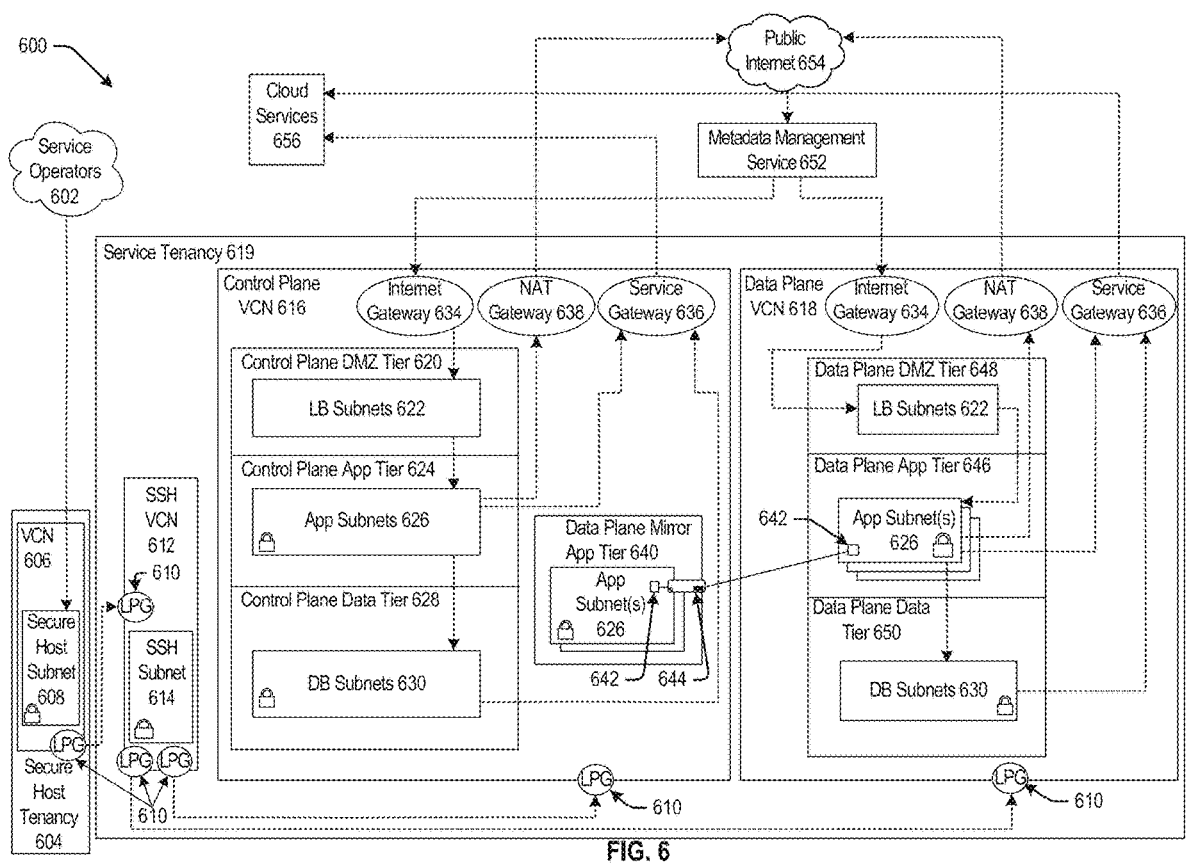
FIG. 6 is a block diagram illustrating one pattern for implementing a cloud infrastructure as a service system, according to at least one embodiment.

FIG. 6 is a block diagram 600 illustrating an example pattern of an IaaS architecture, according to at least one embodiment. Service operators 602 can be communicatively coupled to a secure host tenancy 604 that can include a virtual cloud network (VCN) 606 and a secure host subnet 608. In some examples, the service operators 602 may be using one or more client computing devices, which may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 606 and/or the Internet.

The VCN 606 can include a local peering gateway (LPG) 610 that can be communicatively coupled to a secure shell (SSH) VCN 612 via an LPG 610 contained in the SSH VCN 612. The SSH VCN 612 can include an SSH subnet 614, and the SSH VCN 612 can be communicatively coupled to a control plane VCN 616 via the LPG 610 contained in the control plane VCN 616. Also, the SSH VCN 612 can be communicatively coupled to a data plane VCN 618 via an LPG 610. The control plane VCN 616 and the data plane VCN 618 can be contained in a service tenancy 619 that can be owned and/or operated by the IaaS provider.

The control plane VCN 616 can include a control plane demilitarized zone (DMZ) tier 620 that acts as a perimeter network (e.g., portions of a corporate network between the corporate intranet and external networks). The DMZ-based servers may have restricted responsibilities and help keep security breaches contained. Additionally, the DMZ tier 620 can include one or more load balancer (LB) subnet(s) 622, a control plane app tier 624 that can include app subnet(s) 626, a control plane data tier 628 that can include database (DB) subnet(s) 630 (e.g., frontend DB subnet(s) and/or backend DB subnet(s)). The LB subnet(s) 622 contained in the control plane DMZ tier 620 can be communicatively coupled to the app subnet(s) 626 contained in the control plane app tier 624 and an Internet gateway 634 that can be contained in the control plane VCN 616, and the app subnet(s) 626 can be communicatively coupled to the DB subnet(s) 630 contained in the control plane data tier 628 and a service gateway 636 and a network address translation (NAT) gateway 638. The control plane VCN 616 can include the service gateway 636 and the NAT gateway 638.

The control plane VCN 616 can include a data plane mirror app tier 640 that can include app subnet(s) 626. The app subnet(s) 626 contained in the data plane mirror app tier 640 can include a virtual network interface controller (VNIC) 642 that can execute a compute instance 644. The compute instance 644 can communicatively couple the app subnet(s) 626 of the data plane mirror app tier 640 to app subnet(s) 626 that can be contained in a data plane app tier 646.

The data plane VCN 618 can include the data plane app tier 646, a data plane DMZ tier 648, and a data plane data tier 650. The data plane DMZ tier 648 can include LB subnet(s) 622 that can be communicatively coupled to the app subnet(s) 626 of the data plane app tier 646 and the Internet gateway 634 of the data plane VCN 618. The app subnet(s) 626 can be communicatively coupled to the service gateway 636 of the data plane VCN 618 and the NAT gateway 638 of the data plane VCN 618. The data plane data tier 650 can also include the DB subnet(s) 630 that can be communicatively coupled to the app subnet(s) 626 of the data plane app tier 646.

The Internet gateway 634 of the control plane VCN 616 and of the data plane VCN 618 can be communicatively coupled to a metadata management service 652 that can be communicatively coupled to public Internet 654. Public Internet 654 can be communicatively coupled to the NAT gateway 638 of the control plane VCN 616 and of the data plane VCN 618. The service gateway 636 of the control plane VCN 616 and of the data plane VCN 618 can be communicatively couple to cloud services 656.

In some examples, the service gateway 636 of the control plane VCN 616 or of the data plane VCN 618 can make application programming interface (API) calls to cloud services 656 without going through public Internet 654. The API calls to cloud services 656 from the service gateway 636 can be one-way: the service gateway 636 can make API calls to cloud services 656, and cloud services 656 can send requested data to the service gateway 636. But, cloud services 656 may not initiate API calls to the service gateway 636.

In some examples, the secure host tenancy 604 can be directly connected to the service tenancy 619, which may be otherwise isolated. The secure host subnet 608 can communicate with the SSH subnet 614 through an LPG 610 that may enable two-way communication over an otherwise isolated system. Connecting the secure host subnet 608 to the SSH subnet 614 may give the secure host subnet 608 access to other entities within the service tenancy 619.

The control plane VCN 616 may allow users of the service tenancy 619 to set up or otherwise provision desired resources. Desired resources provisioned in the control plane VCN 616 may be deployed or otherwise used in the data plane VCN 618. In some examples, the control plane VCN 616 can be isolated from the data plane VCN 618, and the data plane mirror app tier 640 of the control plane VCN 616 can communicate with the data plane app tier 646 of the data plane VCN 618 via VNICs 642 that can be contained in the data plane mirror app tier 640 and the data plane app tier 646.

In some examples, users of the system, or customers, can make requests, for example create, read, update, or delete (CRUD) operations, through public Internet 654 that can communicate the requests to the metadata management service 652. The metadata management service 652 can communicate the request to the control plane VCN 616 through the Internet gateway 634. The request can be received by the LB subnet(s) 622 contained in the control plane DMZ tier 620. The LB subnet(s) 622 may determine that the request is valid, and in response to this determination, the LB subnet(s) 622 can transmit the request to app subnet(s) 626 contained in the control plane app tier 624. If the request is validated and requires a call to public Internet 654, the call to public Internet 654 may be transmitted to the NAT gateway 638 that can make the call to public Internet 654. Memory that may be desired to be stored by the request can be stored in the DB subnet(s) 630.

In some examples, the data plane mirror app tier 640 can facilitate direct communication between the control plane VCN 616 and the data plane VCN 618. For example, changes, updates, or other suitable modifications to configuration may be desired to be applied to the resources contained in the data plane VCN 618. Via a VNIC 642, the control plane VCN 616 can directly communicate with, and can thereby execute the changes, updates, or other suitable modifications to configuration to, resources contained in the data plane VCN 618.

In some embodiments, the control plane VCN 616 and the data plane VCN 618 can be contained in the service tenancy 619. In this case, the user, or the customer, of the system may not own or operate either the control plane VCN 616 or the data plane VCN 618. Instead, the IaaS provider may own or operate the control plane VCN 616 and the data plane VCN 618, both of which may be contained in the service tenancy 619. This embodiment can enable isolation of networks that may prevent users or customers from interacting with other users', or other customers', resources. Also, this embodiment may allow users or customers of the system to store databases privately without needing to rely on public Internet 654, which may not have a desired level of security, for storage.

In other embodiments, the LB subnet(s) 622 contained in the control plane VCN 616 can be configured to receive a signal from the service gateway 636. In this embodiment, the control plane VCN 616 and the data plane VCN 618 may be configured to be called by a customer of the IaaS provider without calling public Internet 654. Customers of the IaaS provider may desire this embodiment since database(s) that the customers use may be controlled by the IaaS provider and may be stored on the service tenancy 619, which may be isolated from public Internet 654.

Figure 7:
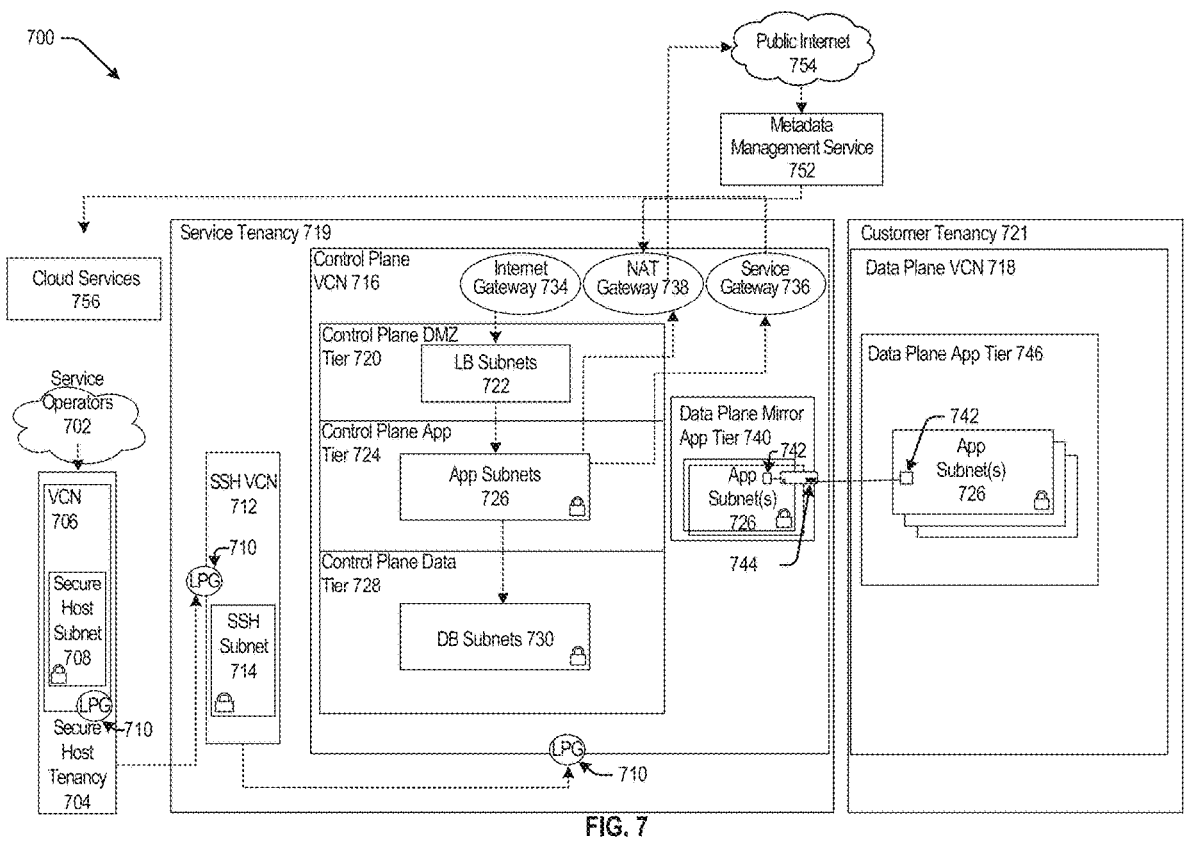
FIG. 7 is a block diagram illustrating another pattern for implementing a cloud infrastructure as a service system, according to at least one embodiment.

FIG. 7 is a block diagram 700 illustrating another example pattern of an IaaS architecture, according to at least one embodiment. Service operators 702 (e.g. service operators 602 of FIG. 6) can be communicatively coupled to a secure host tenancy 704 (e.g. the secure host tenancy 604 of FIG. 6) that can include a virtual cloud network (VCN) 706 (e.g. the VCN 606 of FIG. 6) and a secure host subnet 708 (e.g. the secure host subnet 608 of FIG. 6). The VCN 706 can include a local peering gateway (LPG) 710 (e.g. the LPG 610 of FIG. 6) that can be communicatively coupled to a secure shell (SSH) VCN 712 (e.g. the SSH VCN 612 of FIG. 6) via an LPG 610 contained in the SSH VCN 712. The SSH VCN 712 can include an SSH subnet 714 (e.g. the SSH subnet 614 of FIG. 6), and the SSH VCN 712 can be communicatively coupled to a control plane VCN 716 (e.g. the control plane VCN 616 of FIG. 6) via an LPG 710 contained in the control plane VCN 716. The control plane VCN 716 can be contained in a service tenancy 719 (e.g. the service tenancy 619 of FIG. 6), and the data plane VCN 718 (e.g. the data plane VCN 618 of FIG. 6) can be contained in a customer tenancy 721 that may be owned or operated by users, or customers, of the system.

The control plane VCN 716 can include a control plane DMZ tier 720 (e.g. the control plane DMZ tier 620 of FIG. 6) that can include LB subnet(s) 722 (e.g. LB subnet(s) 622 of FIG. 6), a control plane app tier 724 (e.g. the control plane app tier 624 of FIG. 6) that can include app subnet(s) 726 (e.g. app subnet(s) 626 of FIG. 6), a control plane data tier 728 (e.g. the control plane data tier 628 of FIG. 6) that can include database (DB) subnet(s) 730 (e.g. similar to DB subnet(s) 630 of FIG. 6). The LB subnet(s) 722 contained in the control plane DMZ tier 720 can be communicatively coupled to the app subnet(s) 726 contained in the control plane app tier 724 and an Internet gateway 734 (e.g. the Internet gateway 634 of FIG. 6) that can be contained in the control plane VCN 716, and the app subnet(s) 726 can be communicatively coupled to the DB subnet(s) 730 contained in the control plane data tier 728 and a service gateway 736 (e.g. the service gateway of FIG. 6) and a network address translation (NAT) gateway 738 (e.g. the NAT gateway 638 of FIG. 6). The control plane VCN 716 can include the service gateway 736 and the NAT gateway 738.

The control plane VCN 716 can include a data plane mirror app tier 740 (e.g. the data plane mirror app tier 640 of FIG. 6) that can include app subnet(s) 726. The app subnet(s) 726 contained in the data plane mirror app tier 740 can include a virtual network interface controller (VNIC) 742 (e.g. the VNIC of 642) that can execute a compute instance 744 (e.g. similar to the compute instance 644 of FIG. 6). The compute instance 744 can facilitate communication between the app subnet(s) 726 of the data plane mirror app tier 740 and the app subnet(s) 726 that can be contained in a data plane app tier 746 (e.g. the data plane app tier 646 of FIG. 6) via the VNIC 742 contained in the data plane mirror app tier 740 and the VNIC 742 contained in the data plane app tier 746.

The Internet gateway 734 contained in the control plane VCN 716 can be communicatively coupled to a metadata management service 752 (e.g. the metadata management service 652 of FIG. 6) that can be communicatively coupled to public Internet 754 (e.g. public Internet 654 of FIG. 6). Public Internet 754 can be communicatively coupled to the NAT gateway 738 contained in the control plane VCN 716. The service gateway 736 contained in the control plane VCN 716 can be communicatively couple to cloud services 756 (e.g. cloud services 656 of FIG. 6).

In some examples, the data plane VCN 718 can be contained in the customer tenancy 721. In this case, the IaaS provider may provide the control plane VCN 716 for each customer, and the IaaS provider may, for each customer, set up a unique compute instance 744 that is contained in the service tenancy 719. Each compute instance 744 may allow communication between the control plane VCN 716, contained in the service tenancy 719, and the data plane VCN 718 that is contained in the customer tenancy 721. The compute instance 744 may allow resources, that are provisioned in the control plane VCN 716 that is contained in the service tenancy 719, to be deployed or otherwise used in the data plane VCN 718 that is contained in the customer tenancy 721.

In other examples, the customer of the IaaS provider may have databases that live in the customer tenancy 721. In this example, the control plane VCN 716 can include the data plane mirror app tier 740 that can include app subnet(s) 726. The data plane mirror app tier 740 can reside in the data plane VCN 718, but the data plane mirror app tier 740 may not live in the data plane VCN 718. That is, the data plane mirror app tier 740 may have access to the customer tenancy 721, but the data plane mirror app tier 740 may not exist in the data plane VCN 718 or be owned or operated by the customer of the IaaS provider. The data plane mirror app tier 740 may be configured to make calls to the data plane VCN 718 but may not be configured to make calls to any entity contained in the control plane VCN 716. The customer may desire to deploy or otherwise use resources in the data plane VCN 718 that are provisioned in the control plane VCN 716, and the data plane mirror app tier 740 can facilitate the desired deployment, or other usage of resources, of the customer.

In some embodiments, the customer of the IaaS provider can apply filters to the data plane VCN 718. In this embodiment, the customer can determine what the data plane VCN 718 can access, and the customer may restrict access to public Internet 754 from the data plane VCN 718. The IaaS provider may not be able to apply filters or otherwise control access of the data plane VCN 718 to any outside networks or databases. Applying filters and controls by the customer onto the data plane VCN 718, contained in the customer tenancy 721, can help isolate the data plane VCN 718 from other customers and from public Internet 754.

In some embodiments, cloud services 756 can be called by the service gateway 736 to access services that may not exist on public Internet 754, on the control plane VCN 716, or on the data plane VCN 718. The connection between cloud services 756 and the control plane VCN 716 or the data plane VCN 718 may not be live or continuous. Cloud services 756 may exist on a different network owned or operated by the IaaS provider. Cloud services 756 may be configured to receive calls from the service gateway 736 and may be configured to not receive calls from public Internet 754. Some cloud services 756 may be isolated from other cloud services 756, and the control plane VCN 716 may be isolated from cloud services 756 that may not be in the same region as the control plane VCN 716. For example, the control plane VCN 716 may be located in "Region 1," and cloud service "Deployment 6," may be located in Region 1 and in "Region 2." If a call to Deployment 6 is made by the service gateway 736 contained in the control plane VCN 716 located in Region 1, the call may be transmitted to Deployment 6 in Region 1. In this example, the control plane VCN 716, or Deployment 6 in Region 1, may not be communicatively coupled to, or otherwise in communication with, Deployment 6 in Region 2.

Figure 8:
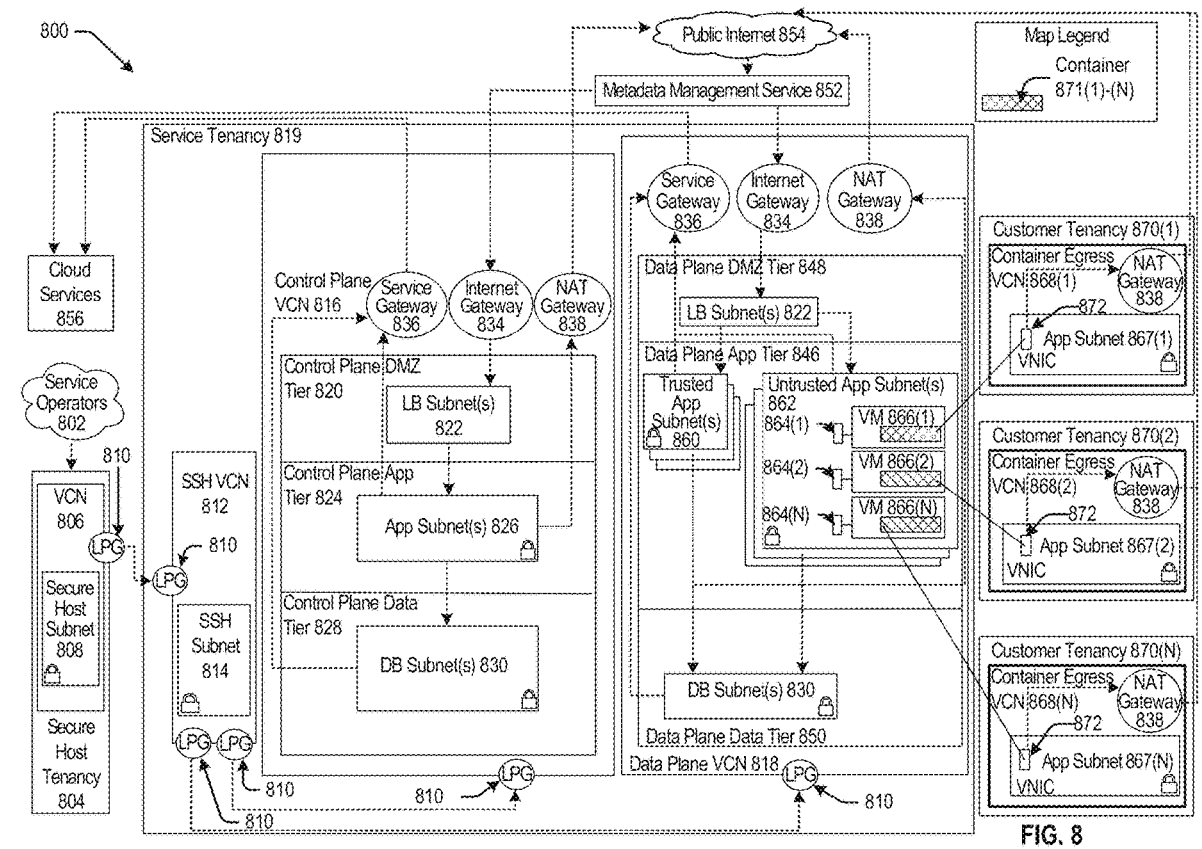
FIG. 8 is a block diagram illustrating another pattern for implementing a cloud infrastructure as a service system, according to at least one embodiment.

FIG. 8 is a block diagram 800 illustrating another example pattern of an IaaS architecture, according to at least one embodiment. Service operators 802 (e.g. service operators 602 of FIG. 6) can be communicatively coupled to a secure host tenancy 804 (e.g. the secure host tenancy 604 of FIG. 6) that can include a virtual cloud network (VCN) 806 (e.g. the VCN 606 of FIG. 6) and a secure host subnet 808 (e.g. the secure host subnet 608 of FIG. 6). The VCN 806 can include an LPG 810 (e.g. the LPG 610 of FIG. 6) that can be communicatively coupled to an SSH VCN 812 (e.g. the SSH VCN 612 of FIG. 6) via an LPG 810 contained in the SSH VCN 812. The SSH VCN 812 can include an SSH subnet 814 (e.g. the SSH subnet 614 of FIG. 6), and the SSH VCN 812 can be communicatively coupled to a control plane VCN 816 (e.g. the control plane VCN 616 of FIG. 6) via an LPG 810 contained in the control plane VCN 816 and to a data plane VCN 818 (e.g. the data plane 618 of FIG. 6) via an LPG 810 contained in the data plane VCN 818. The control plane VCN 816 and the data plane VCN 818 can be contained in a service tenancy 819 (e.g. the service tenancy 619 of FIG. 6).

The control plane VCN 816 can include a control plane DMZ tier 820 (e.g. the control plane DMZ tier 620 of FIG. 6) that can include load balancer (LB) subnet(s) 822 (e.g. LB subnet(s) 622 of FIG. 6), a control plane app tier 824 (e.g. the control plane app tier 624 of FIG. 6) that can include app subnet(s) 826 (e.g. similar to app subnet(s) 626 of FIG. 6), a control plane data tier 828 (e.g. the control plane data tier 628 of FIG. 6) that can include DB subnet(s) 830. The LB subnet(s) 822 contained in the control plane DMZ tier 820 can be communicatively coupled to the app subnet(s) 826 contained in the control plane app tier 824 and to an Internet gateway 834 (e.g. the Internet gateway 634 of FIG. 6) that can be contained in the control plane VCN 816, and the app subnet(s) 826 can be communicatively coupled to the DB subnet(s) 830 contained in the control plane data tier 828 and to a service gateway 836 (e.g. the service gateway of FIG. 6) and a network address translation (NAT) gateway 838 (e.g. the NAT gateway 638 of FIG. 6). The control plane VCN 816 can include the service gateway 836 and the NAT gateway 838.

The data plane VCN 818 can include a data plane app tier 846 (e.g. the data plane app tier 646 of FIG. 6), a data plane DMZ tier 848 (e.g. the data plane DMZ tier 648 of FIG. 6), and a data plane data tier 850 (e.g. the data plane data tier 650 of FIG. 6). The data plane DMZ tier 848 can include LB subnet(s) 822 that can be communicatively coupled to trusted app subnet(s) 860 and untrusted app subnet(s) 862 of the data plane app tier 846 and the Internet gateway 834 contained in the data plane VCN 818. The trusted app subnet(s) 860 can be communicatively coupled to the service gateway 836 contained in the data plane VCN 818, the NAT gateway 838 contained in the data plane VCN 818, and DB subnet(s) 830 contained in the data plane data tier 850. The untrusted app subnet(s) 862 can be communicatively coupled to the service gateway 836 contained in the data plane VCN 818 and DB subnet(s) 830 contained in the data plane data tier 850. The data plane data tier 850 can include DB subnet(s) 830 that can be communicatively coupled to the service gateway 836 contained in the data plane VCN 818.

The untrusted app subnet(s) 862 can include one or more primary VNICs 864(1)-(N) that can be communicatively coupled to tenant virtual machines (VMs) 866(1)-(N). Each tenant VM 866(1)-(N) can be communicatively coupled to a respective app subnet 867(1)-(N) that can be contained in respective container egress VCNs 868(1)-(N) that can be contained in respective customer tenancies 870(1)-(N). Respective secondary VNICs 872(1)-(N) can facilitate communication between the untrusted app subnet(s) 862 contained in the data plane VCN 818 and the app subnet contained in the container egress VCNs 868(1)-(N). Each container egress VCNs 868(1)-(N) can include a NAT gateway 838 that can be communicatively coupled to public Internet 854 (e.g. public Internet 654 of FIG. 6).

The Internet gateway 834 contained in the control plane VCN 816 and contained in the data plane VCN 818 can be communicatively coupled to a metadata management service 852 (e.g. the metadata management system 652 of FIG. 6) that can be communicatively coupled to public Internet 854. Public Internet 854 can be communicatively coupled to the NAT gateway 838 contained in the control plane VCN 816 and contained in the data plane VCN 818. The service gateway 836 contained in the control plane VCN 816 and contained in the data plane VCN 818 can be communicatively couple to cloud services 856.

In some embodiments, the data plane VCN 818 can be integrated with customer tenancies 870. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane tier app 846. Code to run the function may be executed in the VMs 866(1)-(N), and the code may not be configured to run anywhere else on the data plane VCN 818. Each VM 866(1)-(N) may be connected to one customer tenancy 870. Respective containers 871(1)-(N) contained in the VMs 866(1)-(N) may be configured to run the code. In this case, there can be a dual isolation (e.g., the containers 871(1)-(N) running code, where the containers 871(1)-(N) may be contained in at least the VM 866(1)-(N) that are contained in the untrusted app subnet(s) 862), which may help prevent incorrect or otherwise undesirable code from damaging the network of the IaaS provider or from damaging a network of a different customer. The containers 871(1)-(N) may be communicatively coupled to the customer tenancy 870 and may be configured to transmit or receive data from the customer tenancy 870. The containers 871(1)-(N) may not be configured to transmit or receive data from any other entity in the data plane VCN 818. Upon completion of running the code, the IaaS provider may kill or otherwise dispose of the containers 871(1)-(N).

In some embodiments, the trusted app subnet(s) 860 may run code that may be owned or operated by the IaaS provider. In this embodiment, the trusted app subnet(s) 860 may be communicatively coupled to the DB subnet(s) 830 and be configured to execute CRUD operations in the DB subnet(s) 830. The untrusted app subnet(s) 862 may be communicatively coupled to the DB subnet(s) 830, but in this embodiment, the untrusted app subnet(s) may be configured to execute read operations in the DB subnet(s) 830. The containers 871(1)-(N) that can be contained in the VM 866(1)-(N) of each customer and that may run code from the customer may not be communicatively coupled with the DB subnet(s) 830.

In other embodiments, the control plane VCN 816 and the data plane VCN 818 may not be directly communicatively coupled. In this embodiment, there may be no direct communication between the control plane VCN 816 and the data plane VCN 818. However, communication can occur indirectly through at least one method. An LPG 810 may be established by the IaaS provider that can facilitate communication between the control plane VCN 816 and the data plane VCN 818. In another example, the control plane VCN 816 or the data plane VCN 818 can make a call to cloud services 856 via the service gateway 836. For example, a call to cloud services 856 from the control plane VCN 816 can include a request for a service that can communicate with the data plane VCN 818.

Figure 9:
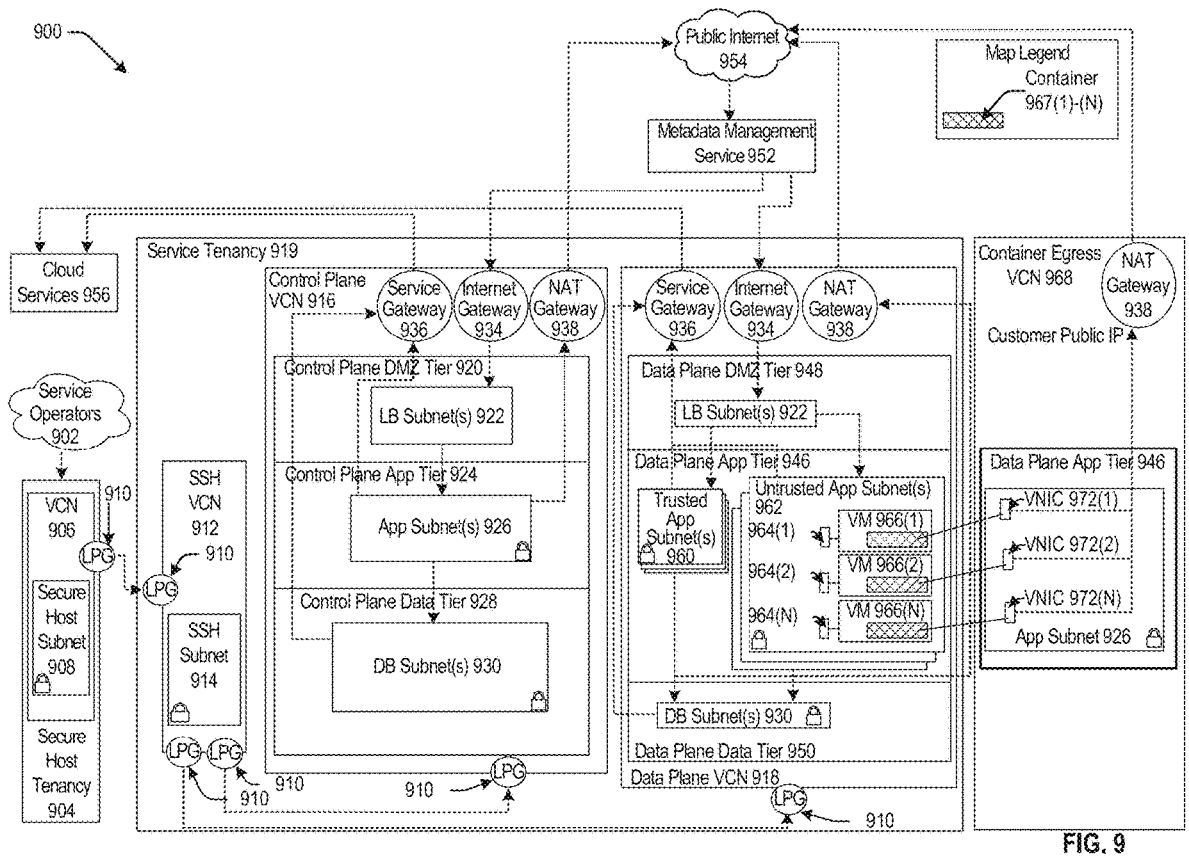
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g. service operators 602 of FIG. 6) can be communicatively coupled to a secure host tenancy 904 (e.g. the secure host tenancy 604 of FIG. 6) that can include a virtual cloud network (VCN) 906 (e.g. the VCN 606 of FIG. 6) and a secure host subnet 908 (e.g. the secure host subnet 608 of FIG. 6). The VCN 906 can include an LPG 910 (e.g. the LPG 610 of FIG. 6) that can be communicatively coupled to an SSH VCN 912 (e.g. the SSH VCN 612 of FIG. 6) via an LPG 910 contained in the SSH VCN 912. The SSH VCN 912 can include an SSH subnet 914 (e.g. the SSH subnet 614 of FIG. 6), and the SSH VCN 912 can be communicatively coupled to a control plane VCN 916 (e.g. the control plane VCN 616 of FIG. 6) via an LPG 910 contained in the control plane VCN 916 and to a data plane VCN 918 (e.g. the data plane 618 of FIG. 6) via an LPG 910 contained in the data plane VCN 918. The control plane VCN 916 and the data plane VCN 918 can be contained in a service tenancy 919 (e.g. the service tenancy 619 of FIG. 6).

The control plane VCN 916 can include a control plane DMZ tier 920 (e.g. the control plane DMZ tier 620 of FIG. 6) that can include LB subnet(s) 922 (e.g. LB subnet(s) 622 of FIG. 6), a control plane app tier 924 (e.g. the control plane app tier 624 of FIG. 6) that can include app subnet(s) 926 (e.g. app subnet(s) 626 of FIG. 6), a control plane data tier 928 (e.g. the control plane data tier 628 of FIG. 6) that can include DB subnet(s) 930 (e.g. DB subnet(s) 830 of FIG. 8). The LB subnet(s) 922 contained in the control plane DMZ tier 920 can be communicatively coupled to the app subnet(s) 926 contained in the control plane app tier 924 and to an Internet gateway 934 (e.g. the Internet gateway 634 of FIG. 6) that can be contained in the control plane VCN 916, and the app subnet(s) 926 can be communicatively coupled to the DB subnet(s) 930 contained in the control plane data tier 928 and to a service gateway 936 (e.g. the service gateway of FIG. 6) and a network address translation (NAT) gateway 938 (e.g. the NAT gateway 638 of FIG. 6). The control plane VCN 916 can include the service gateway 936 and the NAT gateway 938.

The data plane VCN 918 can include a data plane app tier 946 (e.g. the data plane app tier 646 of FIG. 6), a data plane DMZ tier 948 (e.g. the data plane DMZ tier 648 of FIG. 6), and a data plane data tier 950 (e.g. the data plane data tier 650 of FIG. 6). The data plane DMZ tier 948 can include LB subnet(s) 922 that can be communicatively coupled to trusted app subnet(s) 960 (e.g. trusted app subnet(s) 860 of FIG. 8) and untrusted app subnet(s) 962 (e.g. untrusted app subnet(s) 862 of FIG. 8) of the data plane app tier 946 and the Internet gateway 934 contained in the data plane VCN 918. The trusted app subnet(s) 960 can be communicatively coupled to the service gateway 936 contained in the data plane VCN 918, the NAT gateway 938 contained in the data plane VCN 918, and DB subnet(s) 930 contained in the data plane data tier 950. The untrusted app subnet(s) 962 can be communicatively coupled to the service gateway 936 contained in the data plane VCN 918 and DB subnet(s) 930 contained in the data plane data tier 950. The data plane data tier 950 can include DB subnet(s) 930 that can be communicatively coupled to the service gateway 936 contained in the data plane VCN 918.

The untrusted app subnet(s) 962 can include primary VNICs 964(1)-(N) that can be communicatively coupled to tenant virtual machines (VMs) 966(1)-(N) residing within the untrusted app subnet(s) 962. Each tenant VM 966(1)-(N) can run code in a respective container 967(1)-(N), and be communicatively coupled to an app subnet 926 that can be contained in a data plane app tier 946 that can be contained in a container egress VCN 968. Respective secondary VNICs 972(1)-(N) can facilitate communication between the untrusted app subnet(s) 962 contained in the data plane VCN 918 and the app subnet contained in the container egress VCN 968. The container egress VCN can include a NAT gateway 938 that can be communicatively coupled to public Internet 954 (e.g. public Internet 654 of FIG. 6).

The Internet gateway 934 contained in the control plane VCN 916 and contained in the data plane VCN 918 can be communicatively coupled to a metadata management service 952 (e.g. the metadata management system 652 of FIG. 6) that can be communicatively coupled to public Internet 954. Public Internet 954 can be communicatively coupled to the NAT gateway 938 contained in the control plane VCN 916 and contained in the data plane VCN 918. The service gateway 936 contained in the control plane VCN 916 and contained in the data plane VCN 918 can be communicatively couple to cloud services 956.

In some examples, the pattern illustrated by the architecture of block diagram 900 of FIG. 9 may be considered an exception to the pattern illustrated by the architecture of block diagram 800 of FIG. 8 and may be desirable for a customer of the IaaS provider if the IaaS provider cannot directly communicate with the customer (e.g., a disconnected region). The respective containers 967(1)-(N) that are contained in the VMs 966(1)-(N) for each customer can be accessed in real-time by the customer. The containers 967(1)-(N) may be configured to make calls to respective secondary VNICs 972(1)-(N) contained in app subnet(s) 926 of the data plane app tier 946 that can be contained in the container egress VCN 968. The secondary VNICs 972(1)-(N) can transmit the calls to the NAT gateway 938 that may transmit the calls to public Internet 954. In this example, the containers 967(1)-(N) that can be accessed in real-time by the customer can be isolated from the control plane VCN 916 and can be isolated from other entities contained in the data plane VCN 918. The containers 967(1)-(N) may also be isolated from resources from other customers.

In other examples, the customer can use the containers 967(1)-(N) to call cloud services 956. In this example, the customer may run code in the containers 967(1)-(N) that requests a service from cloud services 956. The containers 967(1)-(N) can transmit this request to the secondary VNICs 972(1)-(N) that can transmit the request to the NAT gateway that can transmit the request to public Internet 954. Public Internet 954 can transmit the request to LB subnet(s) 922 contained in the control plane VCN 916 via the Internet gateway 934. In response to determining the request is valid, the LB subnet(s) can transmit the request to app subnet(s) 926 that can transmit the request to cloud services 956 via the service gateway 936.

It should be appreciated that IaaS architectures 600, 700, 800, 900 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Figure 10:
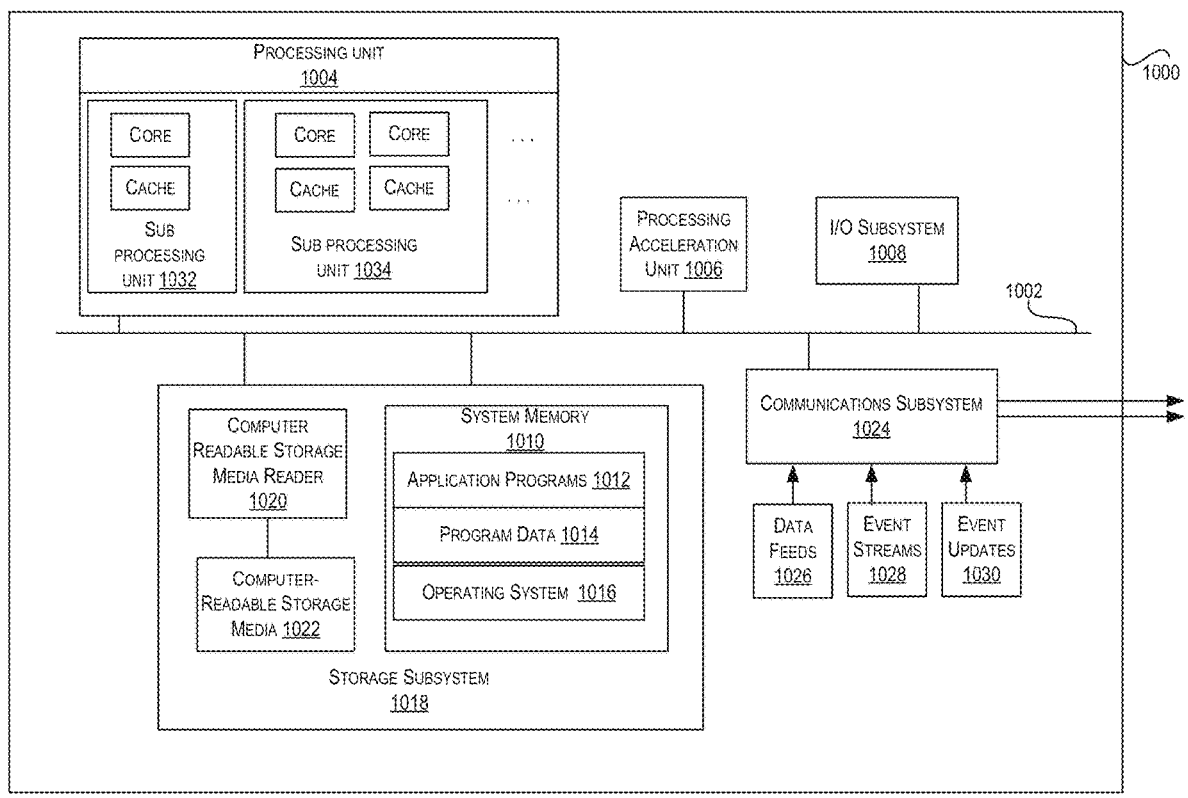
FIG. 10 is a block diagram illustrating an example computer system, according to at least one embodiment.

FIG. 10 illustrates an example computer system 1000, in which various embodiments may be implemented. The system 1000 may be used to implement any of the computer systems described above. As shown in the figure, computer system 1000 includes a processing unit 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 includes tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1004, which can be implemented as one or more integrated circuits (e.g., a conventional microprocessor or microcontroller), controls the operation of computer system 1000. One or more processors may be included in processing unit 1004. These processors may include single core or multicore processors. In certain embodiments, processing unit 1004 may be implemented as one or more independent processing units 1032 and/or 1034 with single or multicore processors included in each processing unit. In other embodiments, processing unit 1004 may also be implemented as a quad-core processing unit formed by integrating two dual-core processors into a single chip.

In various embodiments, processing unit 1004 can execute a variety of programs in response to program code and can maintain multiple concurrently executing programs or processes. At any given time, some or all of the program code to be executed can be resident in processor(s) 1004 and/or in storage subsystem 1018. Through suitable programming, processor(s) 1004 can provide various functionalities described above. Computer system 1000 may additionally include a processing acceleration unit 1006, which can include a digital signal processor (DSP), a special-purpose processor, and/or the like.

I/O subsystem 1008 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1000 may comprise a storage subsystem 1018 that comprises software elements, shown as being currently located within a system memory 1010. System memory 1010 may store program instructions that are loadable and executable on processing unit 1004, as well as data generated during the execution of these programs.

Depending on the configuration and type of computer system 1000, system memory 1010 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 1004. In some implementations, system memory 1010 may include multiple different types of memory, such as static random access memory (SRAM) or dynamic random access memory (DRAM). In some implementations, a basic input/output system (BIOS), containing the basic routines that help to transfer information between elements within computer system 1000, such as during start-up, may typically be stored in the ROM. By way of example, and not limitation, system memory 1010 also illustrates application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 1018 may also provide a tangible computer-readable storage medium for storing the basic programming and data constructs that provide the functionality of some embodiments. Software (programs, code modules, instructions) that when executed by a processor provide the functionality described above may be stored in storage subsystem 1018. These software modules or instructions may be executed by processing unit 1004. Storage subsystem 1018 may also provide a repository for storing data used in accordance with the present disclosure.

Storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for temporarily and/or more permanently containing, storing, transmitting, and retrieving computer-readable information.

Computer-readable storage media 1022 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 1000.

By way of example, computer-readable storage media 1022 may include a hard disk drive that reads from or writes to non-removable, nonvolatile magnetic media, a magnetic disk drive that reads from or writes to a removable, nonvolatile magnetic disk, and an optical disk drive that reads from or writes to a removable, nonvolatile optical disk such as a CD ROM, DVD, and Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 1000.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to connect to one or more devices via the Internet. In some embodiments communications subsystem 1024 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

In some embodiments, communications subsystem 1024 may also receive input communication in the form of structured and/or unstructured data feeds 1026, event streams 1028, event updates 1030, and the like on behalf of one or more users who may use computer system 1000.

By way of example, communications subsystem 1024 may be configured to receive data feeds 1026 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1024 may also be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1000 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method comprising:
   establishing a control plane for a managed service provider (MSP) within a first tenancy in a cloud environment, the control plane being configured to manage a plurality of services offered by the MSP to a set of one or more customer tenancies associated with one or more customers of the cloud environment;
   establishing, for the MSP, a first access plane in a first customer tenancy associated with a first customer, and a second access plane in a second customer tenancy associated with a second customer;
   receiving, by the control plane in the first tenancy, a first request from a first host machine included in the first customer tenancy, the first request requesting a first service provided by the control plane of the MSP, the first request being received by the control plane in the first tenancy via the first access plane;
   receiving, by the control plane in the first tenancy, a second request from a second host machine included in the second customer tenancy, the second request requesting a second service provided by the control plane of the MSP, the second request being received by the control plane in the first tenancy via the second access plane;
   responsive to the first request being validated, providing the first service by the control plane to the first host machine; and
   responsive to the second request being validated, providing the second service by the control plane to the second host machine.

2. The method of claim 1, further comprising:
   validating, by the control plane in the first tenancy, the first request based on a pair of codes associated with the first host machine.

3. The method of claim 1, wherein the first access plane comprises a first gateway, the first request being transmitted by the first host machine to the control plane in the first tenancy via the first gateway.

4. The method of claim 3, wherein the first gateway is allocated a global unique IP address.

5. The method of claim 2, wherein the validating further comprises:
   verifying, by the control plane in the first tenancy, the pair of codes associated with the first host machine, the pair of codes including a first code assigned to the first host machine, and a second code assigned to a region of the cloud environment hosting the first customer tenancy.

6. The method of claim 2, wherein the validating further comprises:
   determining, by the control plane in the first tenancy, whether a first end-point for the first service is configured in the first tenancy; and
   determining, by the control plane in the first tenancy, whether a second end-point for the first service is configured in the first access plane in the first customer tenancy.

7. The method of claim 1, further comprising:
   responsive to the first request not being validated, logging by the control plane of the MSP, a failure of the first request.

8. The method of claim 1, wherein providing the first service further comprises modifying, by the control plane of the MSP, a state of the first host machine.

9. The method of claim 8, wherein modifying the state of the first host machine includes updating, one or more operational parameters of the first host machine.

10. A non-transitory computer readable medium storing specific computer-executable instructions that, when executed by a processor, cause:
    establishing a control plane for a managed service provider (MSP) within a first tenancy in a cloud environment, the control plane being configured to manage a plurality of services offered by the MSP to a set of one or more customer tenancies associated with one or more customers of the cloud environment;
    establishing, for the MSP, a first access plane in a first customer tenancy associated with a first customer, and a second access plane in a second customer tenancy associated with a second customer;
    receiving, by the control plane in the first tenancy, a first request from a first host machine included in the first customer tenancy, the first request requesting a first service provided by the control plane of the MSP, the first request being received by the control plane in the first tenancy via the first access plane;

receiving, by the control plane in the first tenancy, a second request from a second host machine included in the second customer tenancy, the second request requesting a second service provided by the control plane of the MSP, the second request being received by the control plane in the first tenancy via the second access plane;

responsive to the first request being validated, providing the first service by the control plane to the first host machine; and responsive to the second request being validated, providing the second service by the control plane to the second host machine.

11. The non-transitory computer readable medium of claim 10, further comprising computer-executable instructions that when executed by the processor, cause:

validating, by the control plane in the first tenancy, the first request based on a pair of codes associated with the first host machine.

12. The non-transitory computer readable medium of claim 10, wherein the first access plane comprises a first gateway, the first request being transmitted by the first host machine to the control plane in the first tenancy via the first gateway.

13. The non-transitory computer readable medium of claim 12, wherein the first gateway is allocated a global unique IP address.

14. The non-transitory computer readable medium of claim 11, further comprising computer-executable instructions that when executed by the processor, cause:

verifying, by the control plane in the first tenancy, the pair of codes associated with the first host machine, the pair of codes including a first code assigned to the first host machine, and a second code assigned to a region of the cloud environment hosting the first customer tenancy.

15. The non-transitory computer readable medium of claim 11, wherein the validating further comprises:

determining, by the control plane in the first tenancy, whether a first end-point for the first service is configured in the first tenancy; and determining, by the control plane in the first tenancy, whether a second end-point for the first service is configured in the first access plane in the first customer tenancy.

16. The non-transitory computer readable medium of claim 10, further comprising computer-executable instructions that when executed by the processor, cause:

responsive to the first request not being validated, logging by the control plane of the MSP, a failure of the first request.

17. The non-transitory computer readable medium of claim 10, wherein providing the first service further comprises modifying, by the control plane of the MSP, a state of the first host machine.

18. A computing device comprising:

a processor; and a memory including instructions that, when executed with the processor, cause the computing device to, at least:

establish a control plane for a managed service provider (MSP) within a first tenancy in a cloud environment, the control plane being configured to manage a plurality of services offered by the MSP to a set of one or more customer tenancies associated with one or more customers of the cloud environment;

establish, for the MSP, a first access plane in a first customer tenancy associated with a first customer, and a second access plane in a second customer tenancy associated with a second customer;

receive, by the control plane in the first tenancy, a first request from a first host machine included in the first customer tenancy, the first request requesting a first service provided by the control plane of the MSP, the first request being received by the control plane in the first tenancy via the first access plane;

receive, by the control plane in the first tenancy, a second request from a second host machine included in the second customer tenancy, the second request requesting a second service provided by the control plane of the MSP, the second request being received by the control plane in the first tenancy via the second access plane;

responsive to the first request being validated, provide the first service by the control plane to the first host machine; and responsive to the second request being validated, provide the second service by the control plane to the second host machine.

19. The computing device of claim 18, wherein the first access plane comprises a first gateway, the first request being transmitted by the first host machine to the control plane in the first tenancy via the first gateway.

20. The computing device of claim 19, wherein the first gateway is allocated a global unique IP address.

* * * * *

UNITED STATES PATENT AND TRADEMARK OFFICE
CERTIFICATE OF CORRECTION

PATENT NO. : 12,238,166 B2
APPLICATION NO. : 18/221147
DATED : February 25, 2025
INVENTOR(S) : Shah et al.

Page 1 of 1

It is certified that error appears in the above-identified patent and that said Letters Patent is hereby corrected as shown below:

In the Specification

In Column 9, Line 62, delete "etc.)" and insert -- etc.,) --, therefor.

Signed and Sealed this
Third Day of June, 2025

Coke Morgan Stewart
*Acting Director of the United States Patent and Trademark Office*